(12) United States Patent
Miyamoto et al.

(10) Patent No.: US 10,278,070 B2
(45) Date of Patent: Apr. 30, 2019

(54) AUTHENTICATION METHOD FOR AUTHENTICATING A TERMINAL WHEN A DESIGNATED DEVICE IS DETERMINED TO BE MANIPULATED

(71) Applicant: Panasonic Intellectual Property Management Co., Ltd., Osaka (JP)

(72) Inventors: Shingo Miyamoto, Hyogo (JP); Hayashi Ito, Kanagawa (JP); Kumi Harada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 122 days.

(21) Appl. No.: 15/291,438

(22) Filed: Oct. 12, 2016

(65) Prior Publication Data

US 2017/0034701 A1 Feb. 2, 2017

Related U.S. Application Data

(63) Continuation of application No. PCT/JP2016/001375, filed on Mar. 11, 2016.

(30) Foreign Application Priority Data

Jul. 7, 2015 (JP) .................. 2015-136116

(51) Int. Cl.
*H04L 29/06* (2006.01)
*H04W 12/06* (2009.01)
(Continued)

(52) U.S. Cl.
CPC ............ *H04W 12/06* (2013.01); *G06F 21/31* (2013.01); *G06F 21/34* (2013.01); *G06F 21/42* (2013.01); *G06F 21/44* (2013.01); *H04W 4/70* (2018.02)

(58) Field of Classification Search
CPC .......... G06F 21/00; G06F 21/44; G06F 21/42; G06F 3/0482; H04W 12/06; H04W 4/70;
(Continued)

(56) References Cited

U.S. PATENT DOCUMENTS 8,180,886 B2 * 5/2012 Overcash ............ H04L 63/1425
709/224
8,898,784 B1 * 11/2014 Alexander ............ H04L 63/145
709/232

(Continued)

FOREIGN PATENT DOCUMENTS

JP 2002-344371 11/2002
JP 2003-056227 2/2003
(Continued)

OTHER PUBLICATIONS

Original Japanese patent publication JP2004295337A-JP.pdf is attached.*
(Continued)

*Primary Examiner* — Shawnchoy Rahman
*Assistant Examiner* — Lin Chang
(74) *Attorney, Agent, or Firm* — Greenblum & Bernstein, P.L.C.

(57) ABSTRACT

Power usage of each of one or more devices belonging to a group is collected at prescribed intervals, and an authentication request including group identification information for identification of the group to be authenticated is received from a terminal. Upon receipt of the authentication request, a device as a manipulation target in the group and details of a manipulation on the device are determined, and notification is provided to the terminal. Whether the device designated by the notification is manipulated is judged on the basis of a change in the power usage of each of the devices belonging to the group. If the device designated by the
(Continued)

notification is judged to be manipulated, authentication information is transmitted to the terminal.

11 Claims, 13 Drawing Sheets

(51) Int. Cl.
  *H04W 4/70*   (2018.01)
  *G06F 21/44*   (2013.01)
  *G06F 21/42*   (2013.01)
  *G06F 21/31*   (2013.01)
  *G06F 21/34*   (2013.01)

(58) Field of Classification Search
  CPC ........ H04W 4/005; H04W 12/08; H04L 9/32; H04L 67/12; H04L 12/282
  See application file for complete search history.

(56) References Cited

U.S. PATENT DOCUMENTS

| | | | |
|---|---|---|---|
| 9,301,135 B2* | 3/2016 | Sato | H04W 4/70 |
| 2002/0021372 A1* | 2/2002 | Konda | H04N 5/775 |
| | | | 348/730 |
| 2002/0087882 A1* | 7/2002 | Schneier | G06F 21/552 |
| | | | 726/23 |
| 2005/0039047 A1* | 2/2005 | Raikar | H04L 63/1408 |
| | | | 726/4 |
| 2009/0327971 A1* | 12/2009 | Shostack | G06F 21/577 |
| | | | 715/853 |
| 2013/0067536 A1* | 3/2013 | Takahashi | H04L 12/2803 |
| | | | 726/3 |
| 2013/0145030 A1* | 6/2013 | Ohira | H04M 1/72533 |
| | | | 709/225 |
| 2014/0047487 A1* | 2/2014 | Guedalia | H04W 4/70 |
| | | | 725/80 |
| 2014/0129004 A1* | 5/2014 | Takayama | G06Q 10/06 |
| | | | 700/83 |
| 2014/0143863 A1* | 5/2014 | Deb | G06F 21/552 |
| | | | 726/22 |
| 2014/0230018 A1* | 8/2014 | Anantharaman | H04L 63/0861 |
| | | | 726/4 |
| 2014/0237559 A1* | 8/2014 | Zhang | H04W 12/04 |
| | | | 726/4 |
| 2015/0012863 A1* | 1/2015 | Yoshida | G08C 17/02 |
| | | | 715/771 |
| 2015/0095332 A1* | 4/2015 | Beisiegel | H04Q 9/00 |
| | | | 707/737 |
| 2015/0319185 A1* | 11/2015 | Kirti | H04L 63/1416 |
| | | | 726/23 |

FOREIGN PATENT DOCUMENTS

| | | | | |
|---|---|---|---|---|
| JP | 2004295337 | * | 10/2004 | ............ G06F 13/00 |
| JP | 2007-247346 | | 9/2007 | |

OTHER PUBLICATIONS

International Search Report of PCT application No. PCT/JP2016/001375 dated Apr. 12, 2016.

* cited by examiner

| GROUP ID | GW APPARATUS ID | MEASUREMENT TIME | SERVER SAVE TIME | MAIN | BRANCH 1 | BRANCH 2 | ... | BRANCH n |
|---|---|---|---|---|---|---|---|---|
| aaaaa | 1111 | 2015/03/18 12:00:00 | 2015/03/18 12:03:00 | 10 | 1 | 1 | ... | 0 |
| aaaaa | 1111 | 2015/03/18 13:00:00 | 2015/03/18 13:03:00 | 20 | 0 | 0 | ... | 3 |
| aaaaa | 1111 | 2015/03/18 14:00:00 | 2015/03/18 14:03:00 | 30 | 0 | 2 | ... | 1 |
| bbbbb | 2222 | 2015/03/18 12:00:00 | 2015/03/18 12:03:45 | 15 | 1 | 3 | ... | 0 |

| GROUP ID | GW APPARATUS ID | DEVICE ID | DEVICE TYPE | DEVICE MODEL NUMBER | CONNECTION-DESTINATION DISTRIBUTION BOARD BRANCH INFORMATION |
|---|---|---|---|---|---|
| aaaaa | 1111 | zzzz | REFRIGERATOR | RE-001 | BRANCH 1 |
| aaaaa | 1111 | yyyy | AIR CONDITIONER | AC-001 | BRANCH 1 |
| aaaaa | 1111 | xxxx | WASHING MACHINE | WA-001 | BRANCH 2 |
| bbbbb | 2222 | wwww | REFRIGERATOR | RE001 | BRANCH 1 |

AUTHENTICATION METHOD FOR AUTHENTICATING A TERMINAL WHEN A DESIGNATED DEVICE IS DETERMINED TO BE MANIPULATED

BACKGROUND

1. Technical Field

The present disclosure relates to an authentication method for a terminal using power data.

2. Description of the Related Art

There has been available a system for periodically collecting information on household power usage using the Internet, processing collected information, and providing the information as visualized data to a terminal or checking and manipulating the statuses of a plurality of electronic devices in a household from a terminal. The system is required to prevent an unauthorized terminal from receiving visualized data or checking and manipulating the status of an electronic device. Japanese Unexamined Patent Application Publication No. 2003-56227 discloses a technique for authenticating a terminal using information, such as a phone number, associated with a mobile terminal. Japanese Unexamined Patent Application Publication No. 2007-247346 discloses a technique for authenticating a terminal using information, such as a password or biological information, associated with a user. Japanese Unexamined Patent Application Publication No. 2002-344371 discloses a technique for authenticating a terminal using an ID for authentication shared in advance between the authenticating side and the authenticated side.

SUMMARY

However, information sharing method and a management method for avoiding leakage of information used for authentication or personation are complicated, and further consideration is needed for simplification.

In one general aspect, the techniques disclosed here feature an authentication method for a terminal in an authentication system which authenticates the terminal. The authentication method includes collecting power usage of each of one or more devices belonging to a group at prescribed intervals, receiving, from the terminal, an authentication request including group identification information for identification of the group to be authenticated, providing a notification for determining a device as a manipulation target in the group and details of a manipulation on the device and providing notification to the terminal, upon receipt of the authentication request, judging, on a basis of a change in the power usage of each of the devices belonging to the group, whether the device designated by the notification is manipulated, and authenticating the terminal for transmitting authentication information to the terminal if the device designated by the notification is judged to be manipulated.

The above-described aspect has achieved further improvement.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a chart showing an example of a power usage table managed by a power data management section;

FIG. 4 is a chart showing an example of a device management table for a device managed by a group information management section;

Figure 1:
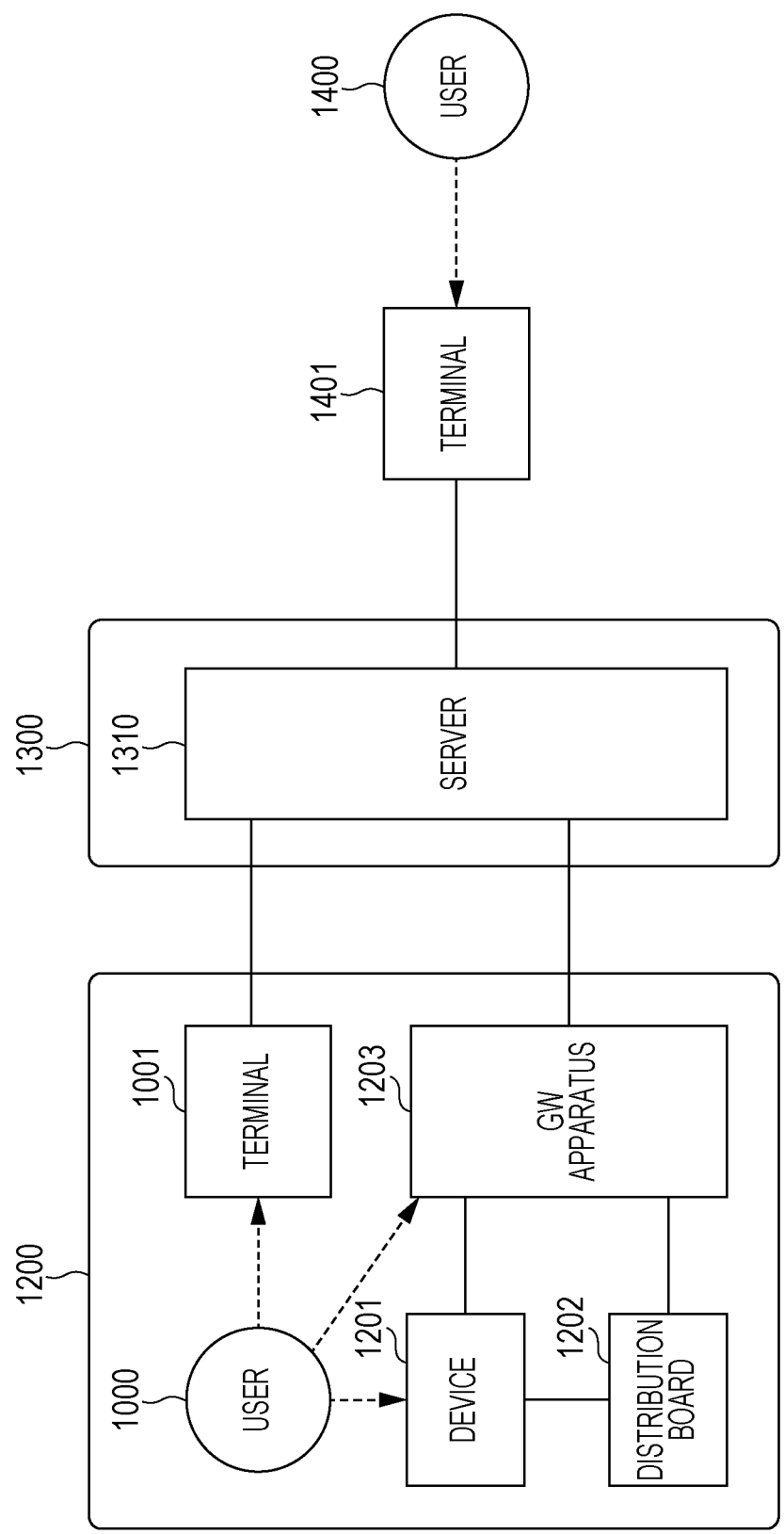
FIG. 1 is a diagram of an example of a full picture of a service to be provided by an authentication system according to an embodiment.

DETAILED DESCRIPTION (Underlying Knowledge Forming Basis of the Present Disclosure)

A technique has been examined for performing authentication by processing and giving and receiving information shared in advance between a server and a terminal to confirm identity at the time of authentication.

In Japanese Unexamined Patent Application Publication No. 2003-56227 described above, an ID number of a person permitted to enter a room, the number of a mobile device of the person permitted to enter the room corresponding to the ID number, and positional information of the vicinity of a security region, in which entry into the security region is permitted, are stored in advance in a management database.

Entry is permitted only if the current position of a mobile device whose ID number is stored in the management database is acquired, and the acquired current position is near the position of the security region.

Japanese Unexamined Patent Application Publication No. 2003-56227, however, suffers from the problem below. If a mobile device is stolen, and a person who has stolen is located in the vicinity of the security region while carrying the mobile device, the person is permitted to enter the security region.

Japanese Unexamined Patent Application Publication No. 2007-247346 described above discloses a technique for receiving biological data (face authentication data, iris authentication data, fingerprint authentication data, or voice-print authentication data) of a user from a mobile phone handset, authenticating the received biological data, receiving a demand for locking or unlocking from the mobile phone handset, and performing locking or unlocking if a phone number of the mobile phone handset is correct.

Some users, however, feel uncomfortable providing information associated with themselves or information associated with their mobile terminals. Japanese Unexamined Patent Application Publication No. 2007-247346 cannot meet the needs of such users.

A service provider which provides a service needs to ensure the security of information provided from a user or information used for authentication and manage information so as to prevent leakage and personation. Service providers thus have a need to reduce management costs for this purpose. Technical solutions for meeting the need have not been fully considered.

For example, in Japanese Unexamined Patent Application Publication No. 2002-344371 described above, a common ID is stored in advance in a device A and in a device B. The device A calculates an authentication value Sa using the ID and a random number Ra. The device B calculates an authentication value Sb using the ID and the random number Ra received from the device A and transmits the authentication value Sb to the device A. The device A disables itself if the authentication value Sa and the authentication value Sb received from the device B are not identical.

However, since the common ID needs to be stored in the device A and in the device B, and the random number Ra is used, Japanese Unexamined Patent Application Publication No. 2002-344371 suffers from the problem of the complexity of information management.

In order to solve the above-described problems, the present authentication method is an authentication method for a terminal in an authentication system which authenticates the terminal. The authentication method executes collecting power usage of each of one or more devices belonging to a group at prescribed intervals, receiving, from the terminal, an authentication request including group identification information for identification of the group to be authenticated, providing a notification for determining a device as a manipulation target in the group and details of a manipulation on the device and providing notification to the terminal, upon receipt of the authentication request, judging, on a basis of a change in the power usage of each of the devices belonging to the group, whether the device designated by the notification is manipulated, and authenticating the terminal for transmitting authentication information to the terminal if the device designated by the notification is judged to be manipulated.

With this configuration, it is possible to authenticate a terminal to be authenticated by providing notification of details of a device manipulation to be performed for authentication to the terminal and judging on the basis of a change in power usage whether the manipulation, notification of which is provided, is performed.

Collecting power usage from each household and managing the power usage have been performed to provide various services to households in recent years. Since if a given manipulation is performed on a given device in a household, power usage changes in accordance with the manipulation, a manipulation on a device can be estimated from a change in power usage. The present authentication method is focused on this point and is capable of authenticating a terminal using existing power usage without bothering to collect separate information for authentication.

In the present authentication method, the above-described estimation is performed on the basis of a change in power usage. It is unnecessary to share an ID among a plurality of devices, unlike Japanese Unexamined Patent Application Publication No. 2002-344371, and random numbers are unnecessary. Management of information used for authentication is easier.

In the present authentication method, authentication is performed through manipulation on a device in a group. For example, if the device is installed inside a home, manipulation of the device by a third party other than a resident in the home is unlikely to occur, and authentication work by a third party can be inhibited. Even if a terminal is stolen, a stealer of the terminal cannot manipulate the device without breaking into the home. This can also inhibit a third party from performing authentication work.

Since the present authentication method uses no biological information, the present authentication method can respond to a desire of a user who refuses to provide biological information.

From the foregoing, the present authentication method can avoid leakage of information used for authentication or personation and provide a simple authentication method.

The providing a notification may further include transmitting part of the notification to the terminal and displaying the rest of the notification on a device which belongs to the group and includes a display apparatus.

With this configuration, a user using a terminal to be authenticated can be guaranteed to be in a group (for example, inside a home) by displaying details of a device manipulation required for authentication on a device belonging to the group (for example, inside the home).

The providing a notification may further include increasing the number of manipulations or increasing the number of devices as manipulation targets with a decrease in the number of authentication requests from the terminal.

According to this configuration, manipulation on a device for authentication is more complicated for a terminal smaller in the total number of times of previous authentication. Validity of the terminal smaller in the number of times of authentication can be thereby guaranteed. The number of times of authentication here may be frequency indicating the number of times of authentication per unit time. In this case, manipulation on a device for authentication is more complicated for a terminal lower in frequency, and validity of the terminal lower in frequency can be guaranteed.

An authentication method according to another aspect is an authentication method for a terminal in an authentication system which authenticates the terminal. The authentication method executes collecting power usage of each of one or more devices belonging to a group at prescribed intervals, receiving, from the terminal, an authentication request including group identification information for identification of the group to be authenticated and details of a manipulation on a device belonging to the group, judging, on a basis of a change in the power usage of each of the devices belonging to the group, whether the device included in the authentication request is manipulated within a prescribed time after the authentication request is received, upon receipt of the authentication request, and authenticating the terminal for transmitting authentication information to the terminal if the device included in the authentication request is judged to be manipulated.

With this configuration, a terminal can be authenticated by judging, on the basis of a change in power usage, whether a manipulation on a device performed for authentication is performed within a prescribed time from reception of details of the manipulation on the device by the authentication system.

As a result, the present authentication method can avoid leakage of information used for authentication and personation and provide a simple authentication method. In the present authentication method, a user determines a device as a manipulation target and manipulation details. The user can prevent erroneous manipulation of a device by, for example, determining an ordinarily familiar device as a device as a manipulation target.

Still another authentication method is an authentication method for a terminal in an authentication system which authenticates the terminal. The authentication method executes collecting power usage of each of one or more devices belonging to a group at prescribed intervals, receiving, from the terminal, an authentication request including group identification information for identification of the group to be authenticated and details of a manipulation on a device belonging to the group, judging, on a basis of a change in the power usage of each of the devices belonging to the group, whether the device included in the authentication request is manipulated within a prescribed time before the authentication request is received, upon receipt of the authentication request, and authenticating the terminal for transmitting authentication information to the terminal if the device included in the authentication request is judged to be manipulated.

As described above, after a prescribed device is manipulated for authentication, notification of details of the manipulation is provided to an authentication system, and the authentication system judges, on the basis of a change in power usage, whether a manipulation of the device is already performed. This allows authentication of a terminal.

As a result, the present authentication method can avoid leakage of information used for authentication and personation and provide a simple authentication method. In the present authentication method, a user determines a device as a manipulation target and manipulation details. The user can smoothly manipulate a device as a manipulation target by, for example, determining an ordinarily familiar device as a device as a manipulation target.

The device designated by the notification may include a device incapable of being remotely manipulated.

With this configuration, a user using a terminal to be authenticated can be guaranteed to be in a group (for example, inside a home) by setting a device incapable of being remotely manipulated as a device to be manipulated for authentication.

The authentication request transmitted from the terminal may include an image of a space where a device belonging to the group is installed, and a device as a target of the manipulation performed for authentication may be identified on a basis of the image.

With this configuration, use of an image of a space where a device as a manipulation target is installed allows a user to easily generate information for identification of a device manipulated for authentication by the user and allows a user using a terminal to be authenticated to be guaranteed to be in a group (for example, inside a home).

The authenticating may further include transmitting the authentication information to the terminal only if the terminal as a transmitter of the authentication request is connected via a device belonging to the group.

With this configuration, for example, only if a terminal to be authenticated is connected via a wireless LAN base unit installed inside a home, a user using the terminal to be authenticated can be guaranteed to be in a group (for example, inside the home) by transmitting authentication information to the terminal to be authenticated.

The authenticating may further include managing the number of currently authenticated terminals and, if the number of currently authenticated terminals reaches a prescribed number set in advance, not transmitting the authentication information to a terminal as an issuer of the authentication request after the prescribed number is reached.

With this configuration, an unnecessary increase in terminals to be authenticated can be avoided.

The authenticating may include setting a time limit for the authentication information to be transmitted to the terminal.

With this configuration, it is possible for a terminal once authenticated to avoid remaining authenticated needlessly.

The authenticating may further include notifying a different terminal, to which the authentication information is already transmitted, of the transmission of the authentication information to the terminal after the transmission of the authentication information to the terminal.

With this configuration, a user using a terminal already authenticated can be notified that a new terminal is authenticated.

The authentication method may further execute storing attribute information for identification of the one or more devices belonging to the group, and the storing may include receiving, from the terminal, an image of a space where a device belonging to the group is installed and storing information for identification of a device identified in the image as the attribute information.

With this configuration, registration of a device as a manipulation target can be performed by a simple method, such as image transmission, at the time of authentication of a terminal.

The judging may be performed through comparing a change in the power usage of each of the devices belonging to the group with information accumulated in advance as a change in power usage caused upon manipulation of the device as a manipulation target.

It is thus possible to judge whether a manipulation of a device for authentication of a terminal is performed, on a basis of whether a change in power usage caused by a manipulation of a device coincides.

The present disclosure can be implemented not only by an authentication method which executes a characteristic process as described above but also as an authentication apparatus or the like including a processing section for executing a characteristic step included in the authentication method. The present disclosure can also be implemented as a computer program which causes a computer to execute each characteristic step included in the above-described authentication method. The computer program can, of course, be circulated via a non-transitory computer-readable recording medium, such as a CD-ROM, or a communication network, such as the Internet.

Embodiments of the present disclosure will be described below with reference to the drawings.

Note that the embodiments described below are all specific examples of the present disclosure. Numerical values, shapes, constituent elements, steps, the order of the steps, and the like illustrated in the embodiments below are merely illustrative, and are not intended to limit the present disclosure. Among the constituent elements in the embodiments below, those not described in an independent claim representing a top-level concept will be described as optional constituent elements. The matters in all of the embodiments can be combined.

(Full Picture of Service to Be Provided)

A full picture of a service to be provided by an authentication system according to the present embodiment will be described.

FIG. 1 is a diagram showing a full picture of a service to be provided by the authentication system according to the present embodiment. The authentication system includes a terminal 1001 used by a user 1000, a group 1200, and a service provider 1300.

The group 1200 is, for example, an enterprise, an organization, or a household, and the scale is not particularly limited. The group 1200 includes one or a plurality of devices 1201, a distribution board 1202, and a gateway apparatus (hereinafter referred to as a GW apparatus) 1203. The devices 1201 include a device capable of connecting to the Internet (for example, a smartphone, a personal computer (PC), or a television) and a device incapable of connecting to the Internet by itself (for example, lighting, a washing machine, or a refrigerator). The devices 1201 may include a device which is incapable of connecting to the Internet by itself but is capable of connecting to the Internet via the GW apparatus 1203.

The user 1000 uses a plurality of devices 1201 in the group 1200. The distribution board 1202 measures power usage in the group 1200. The GW apparatus 1203 collects power usage information from the distribution board 1202 and transmits the power usage information to the service provider 1300.

The service provider 1300 includes a server 1310. The scale of the server 1310 here is not particularly limited, and examples of the server 1310 include a memory in a PC for personal use. The service provider 1300 may not include the server 1310.

Note that the GW apparatus 1203 is dispensable in the above-described authentication system. For example, if the service provider 1300 performs the whole of data management, the GW apparatus 1203 is unnecessary. In some cases (for example, a case where all devices in a household are connected to the Internet), there may be no device incapable of connecting to the Internet by itself.

A flow of information in the above-described authentication system will be described.

The user 1000 manipulates the GW apparatus 1203 to transmit attribute information of the device 1201 in the group 1200 to the server 1310 of the service provider 1300. The attribute information of the device 1201 is information associated with the device 1201. For example, the attribute information of the device 1201 includes device identification data (an ID), a device type, a device model number, and connection-destination distribution board branch information. The attribute information is not limited to above-mentioned information and may include various information which can be associated with a device. The server 1310 saves the received attribute information of the device 1201.

The GW apparatus 1203 in the group 1200 acquires power usage information from the distribution board 1202 and transmits the power usage information to the server 1310 of the service provider 1300. The power usage information here is information related to power usage monitored by the distribution board 1202. The power usage information includes power usage of a main circuit, power usage of each branch circuit, and information on a time of power usage acquisition, and the like. Note that the power usage information is not limited to above-mentioned information and may include various information which can be acquired by the distribution board 1202 or can be associated by the GW apparatus 1203. The server 1310 saves the received power usage information.

Note that attribute information of the device 1201 or power usage information may be transmitted directly from the device 1201 or the distribution board 1202 itself to the server 1310 via the Internet.

The service provider 1300 organizes power usage information into information adapted to a service to be provided to a user and provides the of information to the user. The user, to which the information is provided, may be the user 1000 using the device 1201 or an external user 1400. As a method for providing information to the user 1000 or 1400, for example, information may be provided directly from the service provider 1300 to the terminal 1001 of the user 1000 or a terminal 1401 of the user 1400.

The service provider 1300 may transmit a remote manipulation instruction directed to one capable of being remotely manipulated of the devices 1201 to the GW apparatus 1203 in response to a demand from the terminal 1001 of the user 1000 or the terminal 1401 of the user 1400. The GW apparatus 1203 after reception of the remote manipulation instruction transmits the remote manipulation instruction to the device 1201, and the device 1201 after reception of the remote manipulation instruction executes the remote manipulation instruction.

First Embodiment

[Configuration of Authentication System]

Figure 2:
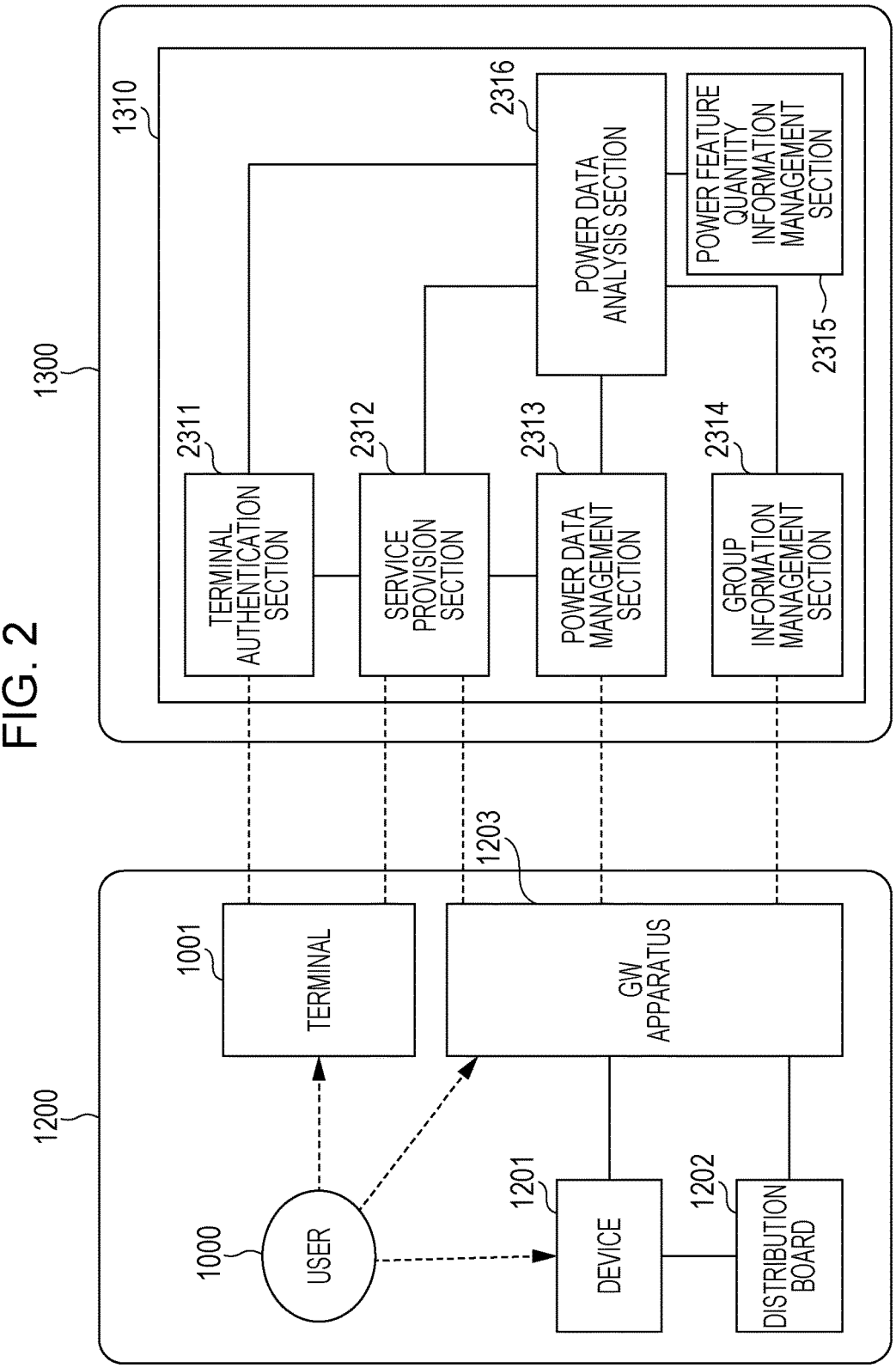
FIG. 2 is a diagram showing an example of the configuration of an authentication system according to a first embodiment.

The configuration of an authentication system according to a first embodiment will be described. FIG. 2 is a diagram showing an example of the configuration of the authentication system according to the first embodiment. The authentication system includes a terminal 1001 used by a user 1000, a group 1200, and a service provider 1300.

The group 1200 is the same as that in FIG. 1, and a description thereof will be omitted.

A server 1310 of the service provider 1300 includes a terminal authentication section 2311, a service provision section 2312, a power data management section 2313, a group information management section 2314, a power feature quantity information management section 2315, and a power data analysis section 2316.

The terminal authentication section 2311 authenticates the terminal 1001.

The service provision section 2312 transmits information in response to a demand from the terminal 1001. The service provision section 2312 also transmits a remote manipulation instruction to a GW apparatus 1203.

The power data management section 2313 receives power usage information in the group 1200 from the GW apparatus 1203 and saves of power usage information.

FIG. 3 is a chart showing an example of a power usage table T300 managed by the power data management section 2313. The power usage table T300 is tabular data in which power usage information is accumulated for one record.

In the example in FIG. 3, the power usage table T300 stores a "group ID", a "GW apparatus ID", a "measurement time", a "server save time", a "main", and "branch 1" to "branch n" in association with one another.

The "group ID" is identification information of the group 1200 and is composed of a string of symbols, by which the group 1200 can be uniquely identified. The "GW apparatus ID" is identification information of the GW apparatus 1203 that is a transmitter of power usage information and is composed of a string of symbols, by which the GW apparatus 1203 can be uniquely identified. The "measurement time" is a time of measurement of power usage. The "server save time" is a time of saving of power usage information by the power data management section 2313. The "main" is power usage of a main circuit which is a component of the distribution board 1202. "Branch 1" to "branch n" are each used power of a corresponding one of first to n-th (an integer not less than 1) branch circuits which are components of the distribution board 1202.

For example, power usage information in a first line is power usage information at a measurement time of "Mar. 18, 2015 at 12:00:00 a.m." transmitted from the GW apparatus 1203 having a GW apparatus ID of "1111" belonging to a group having a group ID of "aaaaa". The power usage information shows that the power usage of the main circuit and the power usage of the first branch circuit to the power usage of the n-th branch circuit are 10 kW, 1 kW, 1 kW, . . . , 0 kW, respectively.

Note that power usage information may be measured at regular intervals (for example, every hour or every half hour) by the distribution board 1202 and transmitted to the power data management section 2313 via the GW apparatus 1203 or may be acquired by the power data management section 2313 transmitting a demand for power usage measurement to the distribution board 1202 via the GW apparatus 1203 at regular intervals or on an as-needed basis.

Referring back to FIG. 2, the group information management section 2314 receives attribute information of the device 1201 from the GW apparatus 1203 and saves the attribute information.

FIG. 4 is a chart showing an example of a device management table T400 for the devices 1201 managed by the group information management section 2314. The device management table T400 is tabular data in which attribute information is accumulated for one record. The attribute information is information about the device 1201 as a management target for the authentication system. In the example in FIG. 4, each of attribute information includes a "group ID", a "GW apparatus ID", a "device ID", a "device type", a "device model number", and a "connection-destination distribution board branch information".

The "group ID" is identification information of a group, to which the device 1201 belongs, and corresponds to a "group ID" shown in FIG. 3. The "GW apparatus ID" is identification information of the GW apparatus 1203, to which the device 1201 is connected, and corresponds to a "GW apparatus ID" shown in FIG. 3. The "device ID" is identification information of the device 1201 and is composed of a string of symbols, by which the device 1201 can be uniquely identified. The "device type" is information indicating the type of the device 1201, such as a refrigerator or an air conditioner. The "device model number" is information indicating a model number assigned to the device 1201 for commodity management. The "connection-destination distribution board branch information" is information for identifying a branch circuit of the distribution board 1202, to which the device 1201 is connected.

For example, attribute information in a first line indicates that the corresponding device 1201 is connected to the GW apparatus 1203 having the GW apparatus ID of "1111" belonging to the group having the group ID of "aaaaa". The attribute information in the first line also indicates that the corresponding device 1201 is a refrigerator having a model number of "RE-001" and a device ID of "zzzz" and is connected to the distribution board 1202 via the first branch circuit.

Referring back to FIG. 2, the power feature quantity information management section 2315 saves a feature quantity of power usage for each device 1201. As feature quantities, waveform information indicating power usage of the device 1201 in an on state and waveform information indicating power usage of the device 1201 in an off state are adopted. Waveform information is information showing a typical waveform pattern indicating a temporal change in power usage of the device 1201. Although waveform information for the on state and waveform information for the off state are adopted as feature quantities here, the present disclosure is not limited to this. Waveform information corresponding to an operation of the device 1201 in a state other than the on state and the off state may be adopted as a feature quantity.

Figure 5:
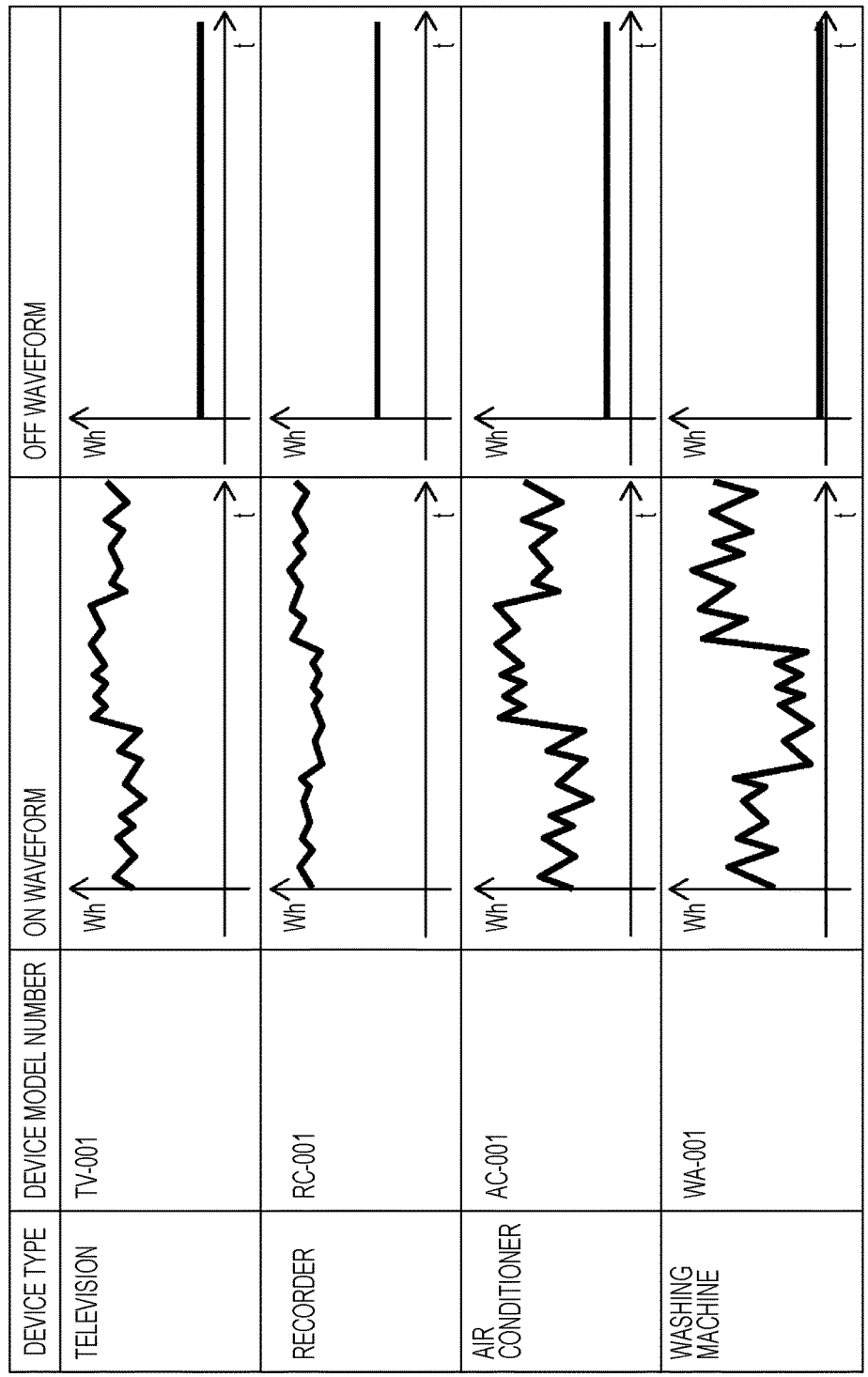
FIG. 5 is a chart showing an example of a feature quantity table managed by a power feature quantity information management section.

FIG. 5 is a chart showing an example of a feature quantity table T500 managed by the power feature quantity information management section 2315.

The feature quantity table T500 saves feature quantities of each of one or more devices 1201 as manipulation targets for one record. In the example in FIG. 5, the feature quantity table T500 stores a "device type", a "device model number", an "on waveform", and an "off waveform" in association with one another. The "device type" is information indicating a device type, such as a television or a recorder, and corresponds to a "device type" in FIG. 4. The "device model number" is information indicating a model number assigned to the device 1201 for commodity management and corresponds to a "device model number" in FIG. 4. The "on waveform" is waveform information of the corresponding device 1201 in the on state. The "off waveform" is waveform information of the corresponding device 1201 in the off state. Power usage in the "off waveform" is lower on the whole than power usage in the "on waveform", and changes flatly but is not 0. The "off waveform" is set with standby power consumption when the device 1201 is in the off state in mind.

FIG. 5 shows waveform information for a "television", a "recorder", an "air conditioner", and a "washing machine". It can be seen from FIG. 5 that the devices 1201 are significantly different from one another in a pattern of change in power usage for the on state and in a pattern of change in power usage for the off state. For example, an on-state waveform of the television has a slightly protruding portion near the center while such a change is not seen for the recorder. An on-state waveform of the air conditioner has a protruding portion near the center, like that of the television. The air conditioner is larger in the height of a protruding portion than the television and is larger in the amplitude of a high-frequency component in a triangular wave shape than the television. The devices 1201 in the off state are significantly different from one another in standby power consumption, and the significant difference is evident in the waveform information. Thus, the present authentication system can estimate a manipulation performed on the device 1201 by comparing a temporal change in power usage acquired from the group 1200 with the waveform information shown in FIG. 5.

Note that although the feature quantity table T500 stores waveform information for four types in FIG. 5, the waveform information are merely illustrative. If there is another device 1201 as the device 1200 as a manipulation target, waveform information of the device 1201 may be stored.

Referring back to FIG. 2, the power data analysis section 2316 compares power usage information saved in the power data management section 2313 with waveform information for the on state and the off state for each device 1201 saved in the power feature quantity information management section 2315 to thereby estimate whether the device 1201 is turned on or turned off, in response to a demand from the terminal authentication section 2311.

[Authentication Operation of Authentication System]

Authentication operation of the authentication system will be described.

Figure 6:
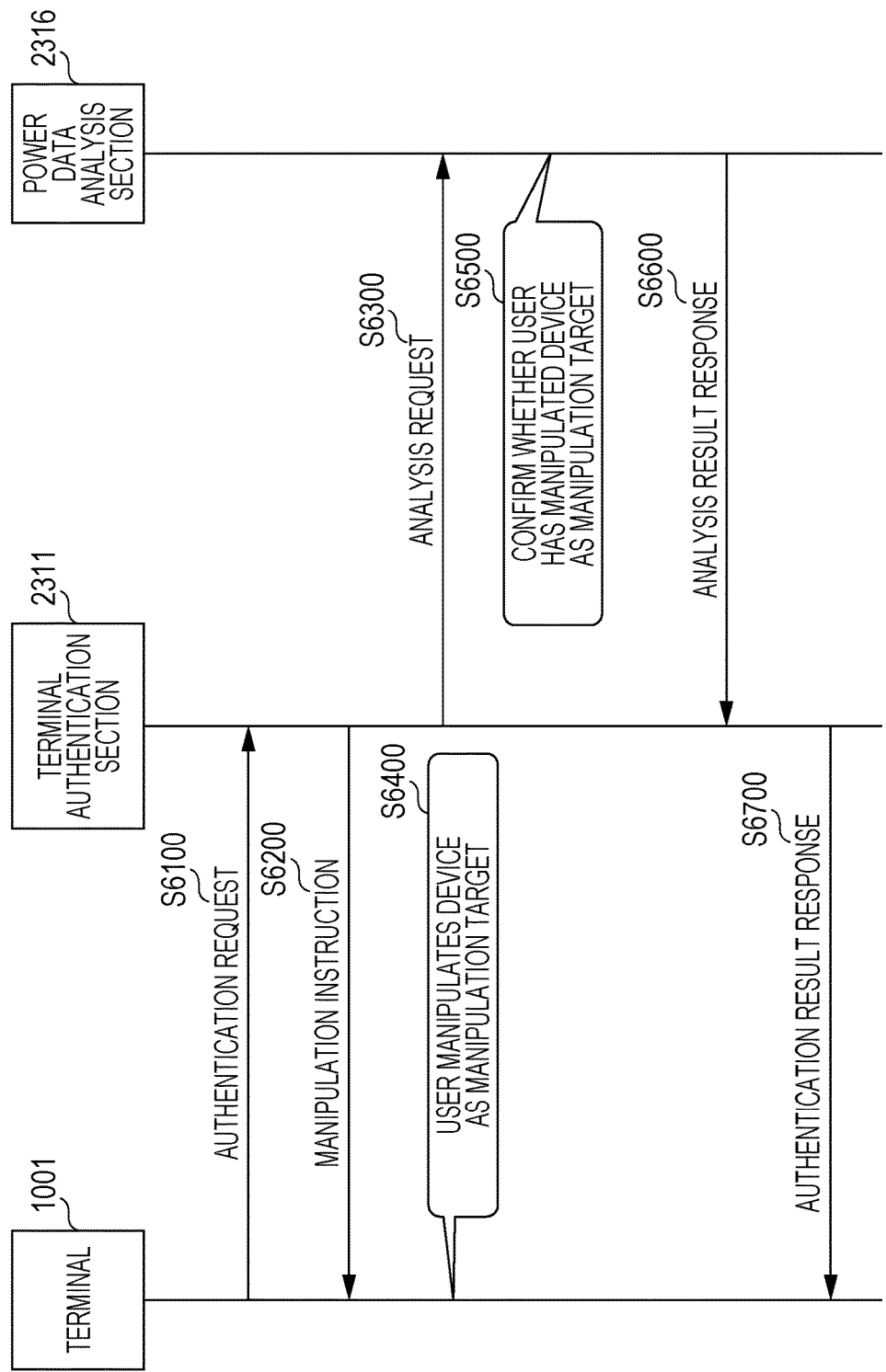
FIG. 6 is a sequence diagram showing an example of a process to be performed between a group and a service provider in authentication operation by the authentication system according to the first embodiment.

FIG. 6 is a sequence diagram showing an example of a process to be performed between the group 1200 and the service provider 1300 in authentication operation of the authentication system according to the first embodiment. The terminal 1001 accepts an instruction to transmit an authentication request from the user 1000 and transmits an authentication request to the server 1310 (S6100).

The authentication request includes a "terminal ID" which is identification information of the terminal 1001 and a "group ID" of the group 1200 as an authentication target. The terminal 1001 is the terminal 1001 that uses a service of the service provider 1300 and is a terminal as an authentication target.

Upon receipt of the authentication request, the terminal authentication section 2311 transmits a manipulation instruction to the terminal 1001 (S6200). The manipulation instruction includes a "device ID" of the device 1201 that is the device 1201 belonging to the group 1200 and is the device 1201 as a manipulation target for the user 1000 and manipulation details (for example, turn-on or turn-off) for the device 1201. The user 1000 manipulates the device 1201 as the manipulation target in accordance with the manipulation details included in the manipulation instruction received by the terminal 1001 (S6400).

Note that, in S6200, the terminal authentication section 2311 may determine the device 1201 as a manipulation target and manipulation details by any method. For example, the terminal authentication section 2311 may randomly select one or more devices 1201 from among the devices 1201 belonging to the group 1200.

Alternatively, the terminal authentication section 2311 may determine manipulation details such that the number of manipulations increases or decreases with the number of times of authentication of the terminal 1001. This case is based on the assumptions that a deadline is set for authentication and that the user 1000 causes the terminal 1001 to be authenticated every time a deadline expires.

Methods for increasing or decreasing the number of manipulations include case (1) where the number of manipulations on one device 1201 is increased or decreased and case (2) where the number of devices 1201 as manipulation targets is increased or decreased.

The terminal authentication section 2311 manages the number of times of authentication of each terminal 1001 using, for example, an authentication management table which manages a "terminal ID" and the "number of times of authentication". In case (1), the terminal authentication section 2311 may reduce manipulation details with an increase in the number of times of authentication. For example, the terminal authentication section 2311 may cause the device 1201 to be manipulated S (S is an integer not less than 2) times for first authentication and cause the device 1201 to be manipulated S−1 times for second authentication. In case (2), the terminal authentication section 2311 may reduce the number of devices 1201 as manipulation targets with an increase in the number of times of authentication. For example, the terminal authentication section 2311 may cause S devices 1201 to be manipulated for first authentication and cause S−1 devices 1201 to be manipulated for second authentication.

Since manipulation on the device 1201 for authentication is more complicated for the terminal 1001 smaller in the total number of times of previous authentication, validity of the terminal 1001 smaller in the number of times of authentication can be guaranteed.

Although adoption of case (1) or case (2) described above as a method for increasing or decreasing the number of manipulations has been described, the present disclosure is not limited to this. A combination of case (1) and case (2) may be adopted.

The terminal authentication section 2311 may increase or decrease the number of manipulations in accordance with frequency indicating the number of times of authentication per unit time instead of simply increasing or decreasing the number of manipulations with the number of times of authentication. Since manipulation on the device 1201 for authentication is more complicated for the terminal 1001 lower in frequency, validity of the terminal 1001 lower in frequency can be guaranteed.

The device 1201 incapable of being remotely manipulated may be included as the device 1201 as a manipulation target. With this inclusion, it is possible to guarantee that the user 1000 using the terminal 1001 to be authenticated is located in the group 1200 (for example, inside a home). In this case, the "remote manipulation availability" field indicating whether remote manipulation is available may be included in the device management table T400, and the terminal authentication section 2311 may determine the device 1201 as a manipulation target from among the devices 1201, each for which information indicating that remote manipulation is available is registered in the "remote manipulation availability" field. Note that this aspect can also be applied to second and third embodiments.

In S6200, a transmission destination of the manipulation instruction transmitted by the terminal authentication section 2311 may be any device 1201 other than the terminal 1001 that belongs to the group 1200 and includes a display. In this case, the terminal authentication section 2311 may judge on the basis of, for example, a "device type" or a "device model number" registered in the device management table T400 whether each device 1201 includes a display.

The terminal authentication section 2311 may divide one block of manipulation details into a plurality of blocks of manipulation details and transmit the divided blocks of manipulation details to the different devices 1201. Alternatively, the terminal authentication section 2311 may transmit a plurality of manipulation instructions different in manipulation details to the terminal 1001 and one or more devices 1201, respectively.

As an aspect which divides one block of manipulation details into a plurality of blocks of manipulation details, for example, the aspect below can be adopted. The aspect displays the portion "Turn on" on the terminal 1001 and displays the portion "the air conditioner in the living room." on a television if one block of manipulation details is "Turn on the air conditioner in the living room."

Figure 10:
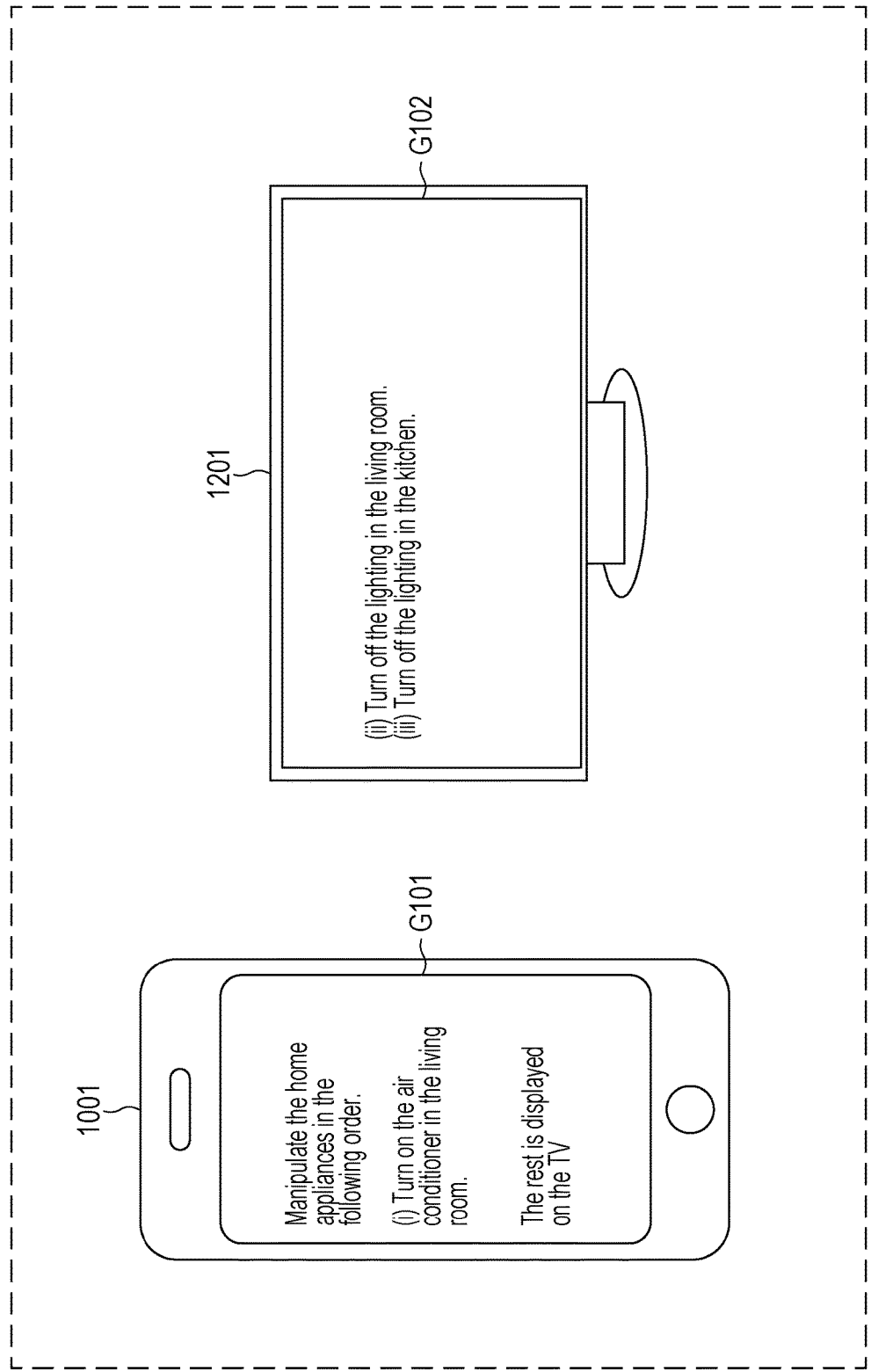
FIG. 10 is a view showing respective examples of display screens displayed on a terminal and the device in a case adopting an aspect in which a plurality of manipulation instructions different in manipulation details are transmitted to the terminal and the device.

FIG. 10 is a view showing respective examples of display screens G101 and G102 displayed on the terminal 1001 and the device 1201 in a case adopting an aspect in which a plurality of manipulation instructions different in manipulation details are transmitted to the terminal 1001 and the device 1201.

In this example, manipulation details include the three blocks of manipulation details: (i) to turn on the air conditioner in the living room; (ii) to turn off the lighting in the living room; and (iii) to turn off the lighting in the kitchen. Thus, the user 1000 needs to manipulate the devices 1201 in the order from (i) to (iii).

The display screen G101 has the message "Manipulate the home appliances in the following order." The message clearly demonstrates to the user 1000 that the devices 1201 need to be manipulated in the order shown in the message.

The display screen G101 has the messages "(i) Turn on the air conditioner in the living room." and "The rest is displayed on the TV". The user 1000 first recognizes that the user 1000 needs to turn on the air conditioner in the living room and that the device 1201 other than the air conditioner is also a manipulation target. The user 1000 also recognizes that the user 1000 needs to view the display screen G102 of the television to know the device 1201 as a manipulation target other than the air conditioner.

The display screen G102 has the message "(ii) Turn off the lighting in the living room. (iii) Turn off the lighting in the kitchen." The user 1000 recognizes that the user 1000 needs to perform manipulations (ii) and (iii) in order subsequent to manipulation (i).

For this reason, the user 1000 manipulates the devices 1201 in the order of (i), (ii), and (iii) and causes the terminal 1001 to be authenticated.

Note that the messages in FIG. 10 are merely illustrative and that any other example may be adopted. An aspect which displays concrete manipulation details not on the terminal 1001 but only on the device 1201 may be adopted. For example, the message "Manipulate the home appliances in the order displayed on the TV." may be displayed on the display screen G101, and messages (i), (ii), and (iii) described above may be displayed on the display screen G102.

In FIG. 10, display of manipulations (i) to (iii) is shared between the terminal 1001 and the television. However, an aspect which shares the three manipulations among three apparatuses including displays and displays the three manipulations (for example, an aspect in which the terminal 1001 displays manipulation (i), the television displays manipulation (ii), and a personal computer displays manipulation (iii)) may be adopted.

The above-described aspects have been illustrated as examples of the manipulation instruction to be transmitted to the terminal 1001 in S6200. A case where the manipulation instruction is transmitted only to the terminal 1001 will be given as an example in the description below.

Referring back to FIG. 6, in S6200, the terminal authentication section 2311 may transmit the manipulation instruction to be transmitted in S6200 as image information indicating the device 1201 as a manipulation target. In this case, in S6100, the terminal 1001 includes an image of a space in the group 1200 as a subject in the authentication request to be transmitted. For example, if the group 1200 is inside a home, a full view or a partial view of a given room inside the home may be adopted as the space or a full view or a partial view of each of a plurality of rooms may be adopted.

The terminal authentication section 2311 analyzes the image, extracts devices included in the image, and determines the device 1201 as a manipulation target from among ones of the extracted devices which belong to the same group registered in the device management table T400. The terminal authentication section 2311 may put a mark denoting a manipulation target on the device 1201 selected as the manipulation target among the devices 1201 included in the received image and include the image in the manipulation instruction. Note that this aspect can also be applied to the second and third embodiments. As will be described later in the second and third embodiments, the user 1000 determines the device 1201 as a manipulation target. For example, the user 1000 may include an image, in which the manipulated device 1201 is marked, in an authentication request and cause the terminal 1001 to transmit the authentication request.

The terminal authentication section 2311 then outputs an analysis request to the power data analysis section 2316 (S6300). The analysis request includes the "group ID" of the group 1200, to which the terminal 1001 as a transmitter of the authentication request belongs, and the "device ID" of the device 1201 as the manipulation target and the "manipulation details (turn-on or turn-off)" included in the manipulation instruction transmitted in S6200.

The power data analysis section 2316 confirms, on the basis of details of the analysis request, whether the user 1000 has manipulated the device 1201 as the manipulation target (S6500) and transmits an analysis result response indicating an analysis result to the terminal authentication section 2311 (S6600). The analysis result response includes an analysis result indicating whether the user 1000 has manipulated the device 1201 as the manipulation target indicated by the analysis request output in S6300 in accordance with the designated manipulation details.

Note that the power data analysis section 2316 may limit an analysis period spent for analysis processing in S6500. For the analysis period, a set value stored in advance in the power data analysis section 2316 may be adopted. A predetermined time, within which a manipulation of the user 1000 on the device 1201 as the manipulation target is expected to end after transmission of the manipulation instruction, may be adopted as the set value.

Alternatively, the terminal authentication section 2311 may include a waiting time for the user 1000 to manipulate the device 1201 as the manipulation target in the analysis request, and the waiting time may be set as the analysis period. Note that, for example, a time set by the user 1000 may be adopted as the waiting time included in the analysis request. In this case, the terminal 1001 may cause the user 1000 to input the waiting time, include the input waiting time in the authentication request, and transmit the authentication request.

Additionally, the terminal 1001 may be caused to transmit end notification indicating that the user 1000 has manipulated the device 1201 as the manipulation target, and the power data analysis section 2316 may end the analysis period upon receipt of the end notification. In this case, when a manipulation of the device 1201 as the manipulation target ends, the user 1000 manipulates the terminal 1001 to cause the terminal 1001 to transmit end notification. Upon receipt of the end notification, the terminal authentication section 2311 may output the received end notification to the power data analysis section 2316 and cause the power data analysis section 2316 to end analysis processing.

Upon receipt of the analysis result response, the terminal authentication section 2311 judges that authentication is successful (the authentication is OK) if the analysis result response includes an analysis result to the effect that the device 1201 as the manipulation target is confirmed to have operated in accordance with the designated manipulation details (hereinafter referred to as an "analysis result to the effect that confirmation is obtained") and judges that the authentication is unsuccessful (the authentication is NG) if the analysis result response includes an analysis result to the effect that the device 1201 as the manipulation target is not confirmed to have operated in accordance with the designated manipulation details (hereinafter referred to as an "analysis result to the effect that confirmation is not obtained"). The terminal authentication section 2311 sends an authentication result in reply to the terminal 1001 (S6700). An authentication result response includes an authentication result indicating whether the authentication is OK or NG and, if the authentication is OK, authentication information (to be described later).

The operation of confirming whether the user 1000 has manipulated a designated device (S6500) by the power data analysis section 2316 will be described in detail.

Figure 7:
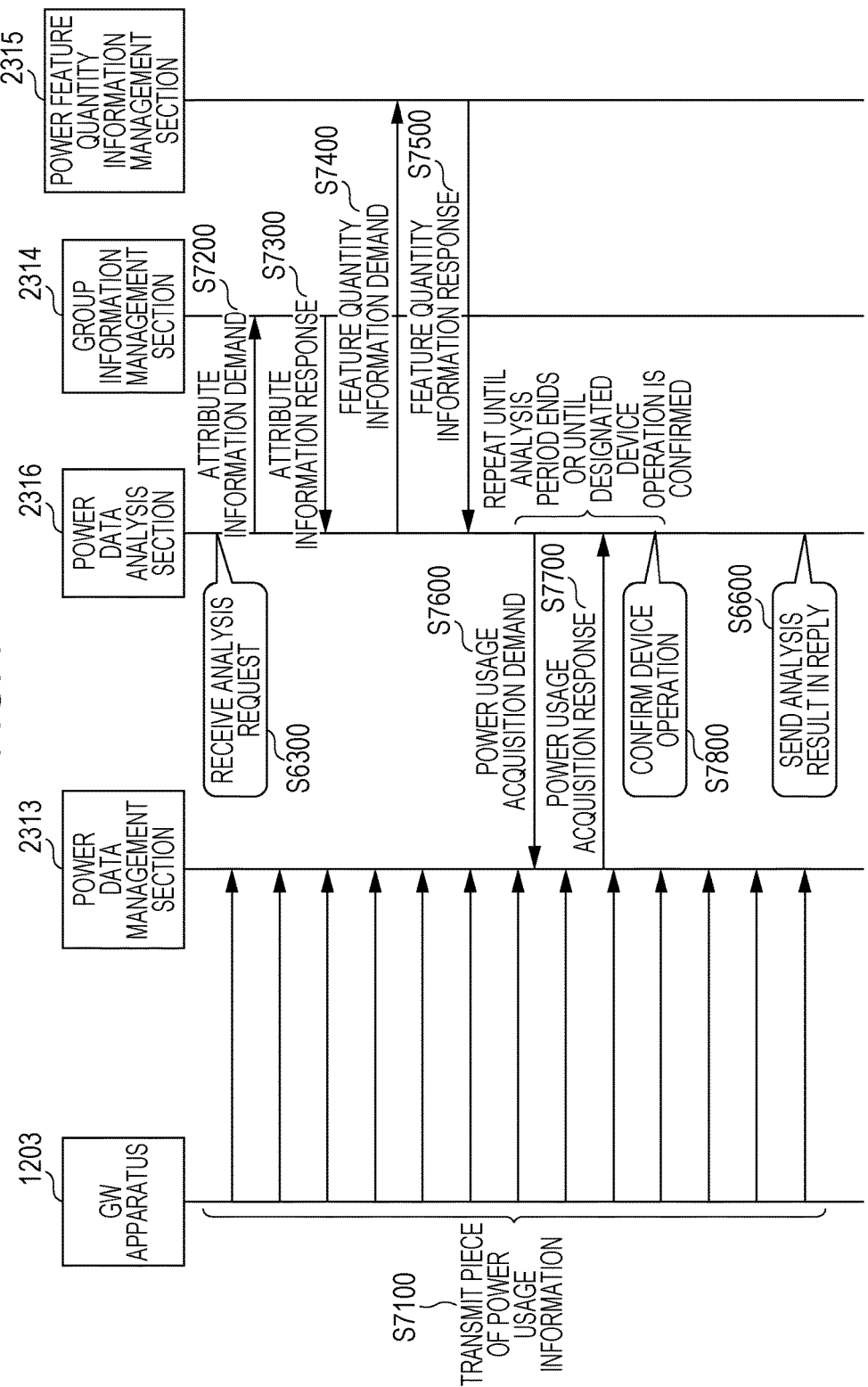
FIG. 7 is a diagram showing an example of a sequence for a power data analysis section to confirm whether a user has manipulated a device as a manipulation target in authentication operation by the authentication system.

FIG. 7 is a diagram showing an example of a sequence for the power data analysis section 2316 to confirm whether the user 1000 has manipulated the device 1201 as a manipulation target in authentication operation of the authentication system. The GW apparatus 1203 periodically acquires power usage information from the distribution board 1202 and transmits the power usage information to the power data management section 2313 (S7100).

Upon receipt of an analysis request in S6300, the power data analysis section 2316 first transmits an attribute information demand for the device 1201 as a manipulation target included in the analysis request to the group information management section 2314 (S7200). The attribute information demand includes a "group ID" of the group 1200, to which the device 1201 as the manipulation target belongs, a "GW apparatus ID" of the GW apparatus 1203, to which the device 1201 as the manipulation target is connected, and a "device ID" of the device 1201 as the manipulation target. The group information management section 2314 after reception of the attribute information demand reads out attribute information of the device 1201 as the manipulation target from the device management table T400, and transmits an attribute information response (S7300).

The attribute information response includes a "device type", a "device model number", and a "connection-destination distribution board branch information" for the device 1201 as the manipulation target. The power data analysis section 2316 after reception of the attribute information response then transmits a feature quantity information demand for acquiring feature quantity information of power usage of the device 1201 to the power feature quantity information management section 2315 on the basis of the attribute information response (S7400). The feature quantity information demand includes the "device type" and the "device model number" of the device 1201 as the manipulation target.

The power feature quantity information management section 2315 after reception of the feature quantity information demand reads out feature quantity information corresponding to the "device type" and the "device model number" included in the feature quantity information demand from the saved feature quantity table T500 and transmits a feature quantity information response to the power data analysis section 2316 (S7500). In this manner, the power data analysis section 2316 acquires the feature quantity information for the device 1201 as the manipulation target. The feature quantity information response includes waveform information indicating power usage when the device 1201 as the manipulation target is in the on state and waveform information indicating power usage when the device 1201 as the manipulation target is in the off state.

The power data analysis section 2316 after the acquisition of the feature quantity information transmits a power usage acquisition demand for acquiring power usage of the device 1201 as the manipulation target to the power data management section 2313 on the basis of the attribute information (S7600). The power usage acquisition demand includes the "group ID" of the group 1200, to which the device 1201 as the manipulation target belongs, the "GW apparatus ID" of the GW apparatus 1203, to which the device 1201 as the manipulation target is connected, the "device ID" of the device 1201 as the manipulation target, the range of "measurement times" for power usage, and the "device connection-destination distribution board branch information".

The power data management section 2313 after reception of the power usage acquisition demand transmits a power usage acquisition response including power usage information within the designated "measurement time" range from the saved power usage table T300 (S7700). The power usage acquisition response includes a "measurement time" and "power usage of each branch circuit" of each of power usage information. The "power usage of each branch circuit" is power usage of each of branch circuits denoted by "main" and "branch 1" to "branch n" in the power usage table T300 in FIG. 3.

The power data analysis section 2316 after acquisition of the power usage response converts the power usage of the device 1201 as the manipulation target received in S7700 into waveform information by plotting the power usage along the ordinate and plotting time along the abscissa in a two-dimensional coordinate space. The power data analysis section 2316 compares the waveform information obtained through the conversion with the waveform information when the device 1201 as the manipulation target is in the on state or the off state acquired in S7500 and confirms whether the device 1201 as the manipulation target designated in the analysis request has operated in accordance with the designated manipulation details (S7800).

The power data analysis section 2316 repeats the processes in S7600 to S7800 until an analysis period ends or until the device 1201 as the manipulation target is confirmed to have operated in accordance with the designated manipulation details.

Figure 8:
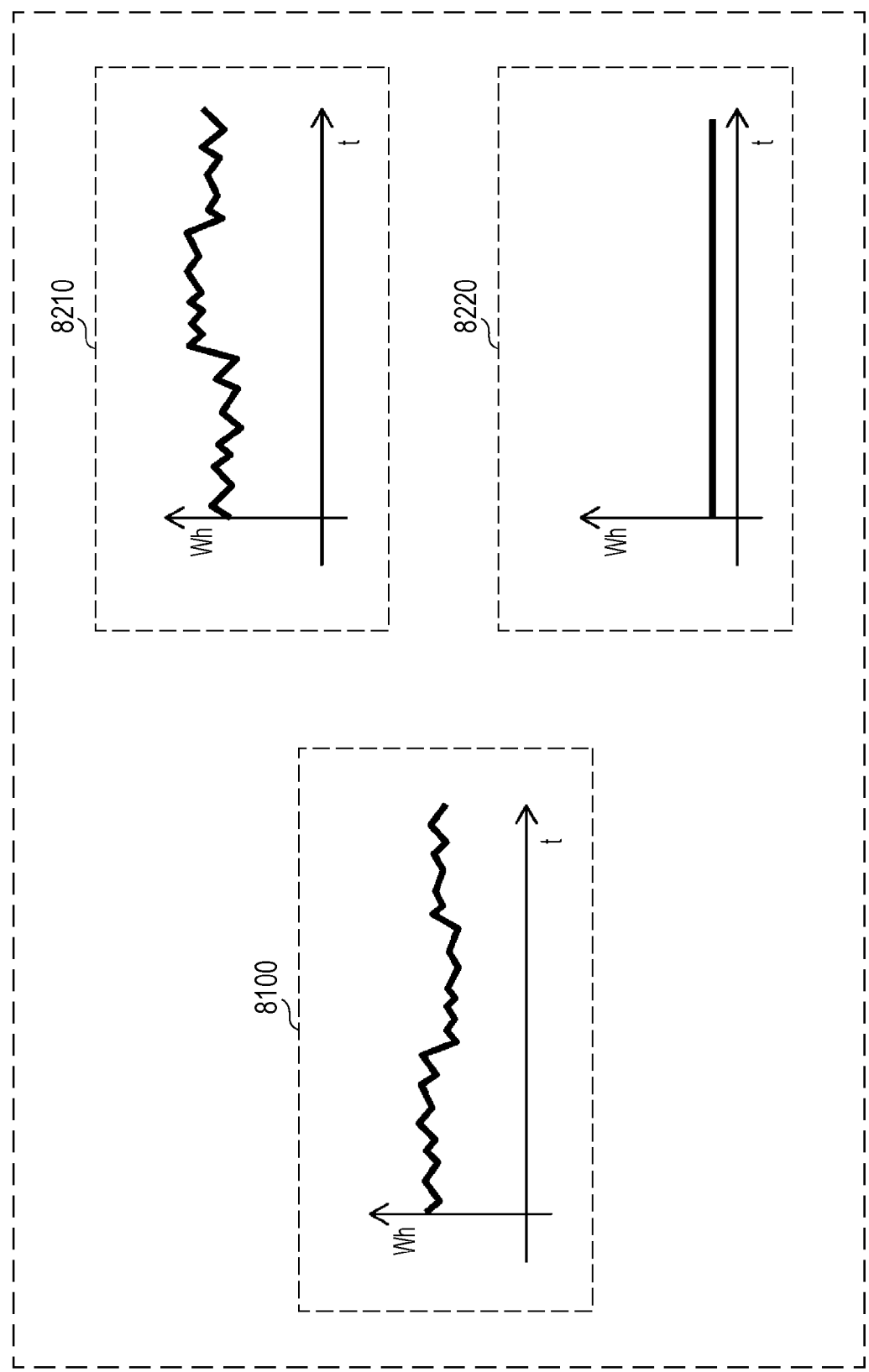
FIG. 8 is a chart showing respective examples of waveform information which the power data analysis section obtains by converting power usage information received in S7700 and waveform information acquired in S7500 when the device as the manipulation target is in an on state and when the device as the manipulation target is in an off state.

FIG. 8 is a chart showing respective examples of waveform information which the power data analysis section 2316 obtains by converting the power usage information received in S7700 and the waveform information acquired in S7500 when the device 1201 as the manipulation target is in the on state and when the device 1201 as the manipulation target is in the off state. Waveform information 8100 is waveform information on power usage received in S7700, waveform information 8210 indicates the waveform information acquired in S7500 when the device 1201 as the manipulation target is in the on state, and waveform information 8220 indicates the waveform information acquired in S7500 when the device 1201 as the manipulation target is in the off state.

In this case, the power data analysis section 2316 may compare the waveform information 8100 with the waveform information 8210 or the waveform information 8220 and judge whether the device 1201 as the manipulation target is on or off.

More specifically, if the designated manipulation details are "to turn on the device 1201 as the manipulation target", the power data analysis section 2316 calculates similarity between the waveform information 8100 and the waveform information 8210. If the calculated similarity exceeds a prescribed threshold, the device 1201 as the manipulation target may be judged to be turned on. If the designated manipulation details are "to turn off the device 1201 as the manipulation target", the power data analysis section 2316 calculates similarity between the waveform information 8100 and the waveform information 8220. If the calculated similarity exceeds the prescribed threshold, the device 1201 as the manipulation target may be judged to be turned off.

If designated manipulation details are "to turn on the device 1201 as the manipulation target and then turn off the device 1201 as the manipulation target", the power data analysis section 2316 compares the acquired waveform information 8100 with the waveform information 8210 for the on state and confirms whether the device 1201 as the manipulation target is turned on each time the waveform information 8100 for a fixed period as shown in FIG. 8 is acquired. If the device 1201 as the manipulation target is confirmed to be turned on, the power data analysis section 2316 then compares the acquired waveform information 8100 with the waveform information 8220 for the off state and confirms whether the device 1201 as the manipulation target is turned off each time the waveform information 8100 for the fixed period is acquired. If the device 1201 as the manipulation target is confirmed to be turned off, the power data analysis section 2316 may judge that the device 1201 as the manipulation target is manipulated in accordance with the designated manipulation details.

Note that although the above-described description shows that the acquired waveform information 8100 is compared with the waveform information 8210 or the waveform information 8220 while the waveform information 8100 for the fixed period is acquired, the present disclosure is not limited to this. For example, the power data analysis section 2316 may acquire waveform information 8100 indicating power consumption for a fixed period in the past from the power data management section 2313 after completion of a manipulation by a user and then may compare the waveform information 8100 with the waveform information 8210 or the waveform information 8220.

Note that the manipulation details may be, for example, "to repeat a manipulation of turning on the device 1201 as the manipulation target and then turning off the device 1201 as the manipulation target n (n is an integer not less than 2) times".

In this case, if the manipulation of turning on the device 1201 as the manipulation target and then turning off the device 1201 as the manipulation target can be detected n times within the analysis period, the power data analysis section 2316 may judge that the device 1201 as the manipulation target is manipulated in accordance with the designated manipulation details.

The power data analysis section 2316 repeats the processes in S7600 to S7800 until the analysis period expires or until the device 1201 as the manipulation target is confirmed to have operated in accordance with the designated manipulation details. If the device 1201 as the manipulation target is confirmed to have operated in accordance with the designated manipulation details within the analysis period, the power data analysis section 2316 generates an analysis result response including an analysis result to the effect that confirmation is obtained. On the other hand, if the device 1201 as the manipulation target is not confirmed to have operated in accordance with the designated manipulation details within the analysis period, the power data analysis section 2316 generates an analysis result response including an analysis result to the effect that confirmation is not obtained. Finally, the power data analysis section 2316 transmits the analysis result response to the terminal authentication section 2311 (S6600).

The terminal authentication section 2311 judges that the authentication is OK if the terminal authentication section 2311 receives the analysis result response including the analysis result to the effect that confirmation is obtained and judges that the authentication is NG if the terminal authentication section 2311 receives the analysis result response including the analysis result to the effect that confirmation is not obtained. The analysis result response obtained if authentication is OK includes authentication information.

The authentication information is information needed in a case where the terminal 1001 that is once authenticated through a prescribed manipulation on the device 1201 as the manipulation target proves to the service provider 1300 that the terminal 1001 is authenticated.

That is, the terminal 1001 that is once authenticated provides the authentication information to the terminal authentication section 2311 and requests service provision, for example, at the time of access to the service provider 1300, and the service provision section 2312 requests the terminal authentication section 2311 to confirm validity of the authentication information. The service provision section 2312 controls whether to provide a service in accordance with a judgment by the terminal authentication section 2311.

Note that an indicator for the terminal authentication section 2311 to judge whether authentication is OK or NG may be added. For the indicator, the aspect below can be adopted. For example, the terminal authentication section 2311 may judge that authentication is OK only if the terminal 1001 transmits an authentication request via the device 1201 or the GW apparatus 1203 belonging to the group 1200. In this case, for example, if the authentication request includes a "GW apparatus ID" as identification information of a transmission source node or a relay node, and the "GW apparatus ID" is a "GW apparatus ID" registered in the device management table T400, the terminal authentication section 2311 may judge that authentication is OK. This allows the user 1000 to be guaranteed to be in the group 1200 (for example, inside a home). Note that the aspect can also be applied to the second and third embodiments.

Alternatively, the terminal authentication section 2311 may judge that authentication is OK only if the number (M (an integer not less than 1)) of authenticable terminals 1001 that is set in advance is not exceeded in the group 1200.

In this case, the terminal authentication section 2311, for example, manages the number of terminals 1001, to which respective authentication information are currently issued in each group 1200. If the terminal authentication section 2311 receives an authentication request from the (M+1)-th terminal 1001, the terminal authentication section 2311 may judge that authentication is NG. This avoids an unnecessary increase in the terminals 1001 to be authenticated. Note that the aspect can also be applied to the second and third embodiments.

A time limit may be set for authentication information included in an analysis result response including an analysis result to the effect that confirmation is obtained. In this case, an expiring time may be put in the authentication information. The terminal authentication section 2311 may judge that authentication information is not valid if the expiring time included in the authentication information received from the terminal 1001 is a time earlier than a current time. In this case, the service provision section 2312 inhibits the terminal 1001 from utilizing the service provider 1300. This can avoid a situation where the terminal 1001 once authenticated remains authenticated in an undesirable manner. Note that the aspect can also be applied to the second and third embodiments.

If the terminal authentication section 2311 receives the analysis result response from the power data analysis section 2316 in S6600, the terminal authentication section 2311 may transmit information on the newly authenticated terminal 1001 to all terminals 1001 that are already authenticated. In this case, the terminal authentication section 2311 may transmit the information on the newly authenticated terminal 1001 to the authenticated terminal 1001 belonging to the same group 1200 as the newly authenticated terminal 1001. As the information on the terminal 1001 to be transmitted, for example, the name of a user using the terminal 1001, a device type name, a phone number, or a communication address can be adopted. More specifically, the terminal authentication section 2311 may manage for each group 1200 the authenticated terminals 1001 using an authenticated terminal management table, in which "terminal IDs" of the authenticated terminals 1001 are registered. This allows a user using the already authenticated terminal 1001 to be notified that the new terminal 1001 has been authenticated. It is thus possible to provide, to a registered user, information for judging whether the newly authenticated terminal 1001 is the third-party terminal 1001 outside the group 1200. Note that the aspect can also be applied to the second and third embodiments.

Additionally, although to turn the state on and to turn the state off are adopted as manipulation details for the device 1201 as the manipulation target in the present embodiment, any other block of manipulation details may be adopted. For example, a manipulation of designating a level in a lighting fixture capable of stepwise dimming or a manipulation of designating a wash program of a washing machine may be adopted as manipulation details. In this case, the power feature quantity information management section 2315 may save waveform information on power usage for each block of manipulation details of the device 1201, and the power data analysis section 2316 may compare the waveform information for the corresponding manipulation details with the waveform information on the power usage received in S7700 and judge whether the device 1201 as the manipulation target is manipulated in accordance with the manipulation details.

If the device 1201 as the manipulation target is a cooking device doubling as an oven and a microwave, "Run the cooking device in microwave mode." or "Run the cooking device in oven mode." may be adopted as manipulation details. In this case, the power feature quantity information management section 2315 may store waveform information on power usage when the cooking device is run in microwave mode and waveform information on power usage when the cooking device is run in oven mode. The power data analysis section 2316 may judge whether the cooking device is run in microwave mode or in oven mode, using these waveform information.

[Attribute Information Registration Operation in Authentication System]

An operation of registering attribute information in the authentication system will be described.

Figure 9:
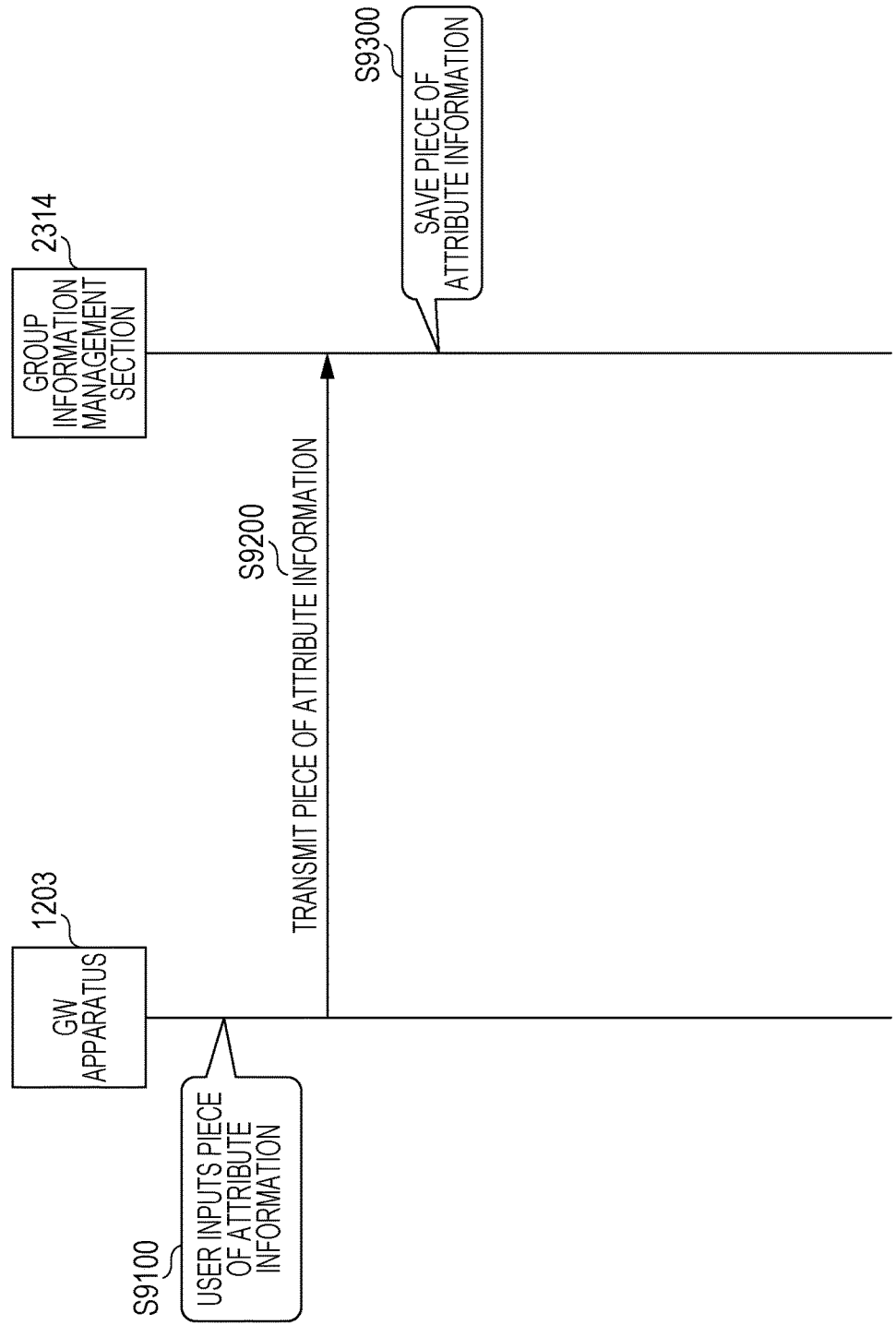
FIG. 9 is a diagram showing an example of a sequence for a registration operation of registering attribute information used in authentication operation in the power data management section.

FIG. 9 is a diagram showing an example of a sequence for a registration operation of registering attribute information used in authentication operation in the power data management section 2313.

The user 1000 inputs attribute information of the device 1201 to the GW apparatus 1203 (S9100). The GW apparatus 1203 transmits the input attribute information to the power data management section 2313 (S9200). attribute information to be input includes a "group ID", a "device ID", a "device type", a "device model number", and a "connection-destination distribution board branch information" shown in the device management table T400 (FIG. 4).

The power data management section 2313 after reception of the attribute information, for example, saves the received attribute information in the device management table T400 (S9300).

Note that the attribute information input by the user 1000 in S9100 may be an image of the device 1201 desired to be registered as a subject. In this case, the GW apparatus 1203 may transmit the attribute information with an image included in S9200, and the power data management section 2313 may analyze the image, identify the device 1201, and register the device 1201 in the device management table T400. The image may include one device 1201 as a registration target or a plurality of devices 1201 as registration targets. The power data management section 2313 may extract an image indicating the device 1201 using a model number, a serial number, or a logo put on a housing of the device 1201 as a guide and register the extracted image as attribute information in the device management table T400. Note that the aspect can also be applied to the second and third embodiments.

If a plurality of devices 1201 are included in the image, and one of the devices 1201 is desired to be registered, the user 1000 may cause the GW apparatus 1203 to transmit an image with a mark put on a spot where the device 1201 appears. In this case, the power data management section 2313 may extract an image of the device 1201 using the mark as a guide and register the device 1201 in the device management table T400.

Note that since the power data analysis section 2316 cannot identify the group 1200, to which the device 1201 belongs, or a branch circuit, to which the device 1201 is connected, at the time of transmission of an image from the GW apparatus 1203, the GW apparatus 1203 may transmit information on a group ID and a branch circuit to be connected together with the image.

A subject included in an image may be any subject as long as the device 1201 can be identified. For example, a model number of the device 1201 may be a subject or a barcode, a QR Code®, or the like, into which device information is encoded, may be a subject.

As described above, transmission of an image allows the device management table T400 to have the information of an image of the device 1201. For this reason, the terminal authentication section 2311 can check an image included in an authentication request against the device management table T400 and determine the device 1201 as the manipulation target.

More specifically, in S6100 in FIG. 6, the user 1000 includes an image of a space in the group 1200 as a subject in an authentication request and causes the terminal 1001 to transmit the authentication request to the terminal authentication section 2311. In S6200 in FIG. 6, the terminal authentication section 2311 extracts one or more images indicating the device(s) 1201 from the transmitted image and checks each extracted image indicating the device 1201 against images registered in the device management table T400. The terminal authentication section 2311 may determine the device 1201 as the manipulation target from among images which are each an image indicating the extracted device 1201 and registered in the device management table T400, include an image indicating the determined device 1201 as the manipulation target in a manipulation instruction, and transmit the manipulation instruction to the terminal 1001. For this reason, the terminal authentication section 2311 can include an image of the device 1201 as the manipulation target in a manipulation instruction and present the image of the device 1201 as the manipulation target to the user 1000. As a result, the user 1000 can be prevented from erroneously manipulating the device 1201 different from the device 1201 as the manipulation target.

Note that although an image registered in the device management table T400 has been described above as an image transmitted by the user 1000, the present disclosure is not limited to this. An image of the device 1201 prepared in advance by the service provider 1300 may be registered in the device management table T400.

Second Embodiment

In the authentication system according to the first embodiment, the server 1310 determines the device 1201 as a manipulation target and manipulation details. A second embodiment is characterized in that a user 1000 determines a device 1201 as a manipulation target and manipulation details. Note that the same components in the present embodiment as those in the first embodiment are denoted by same reference characters and that a description of the components will be omitted.

Figure 11:
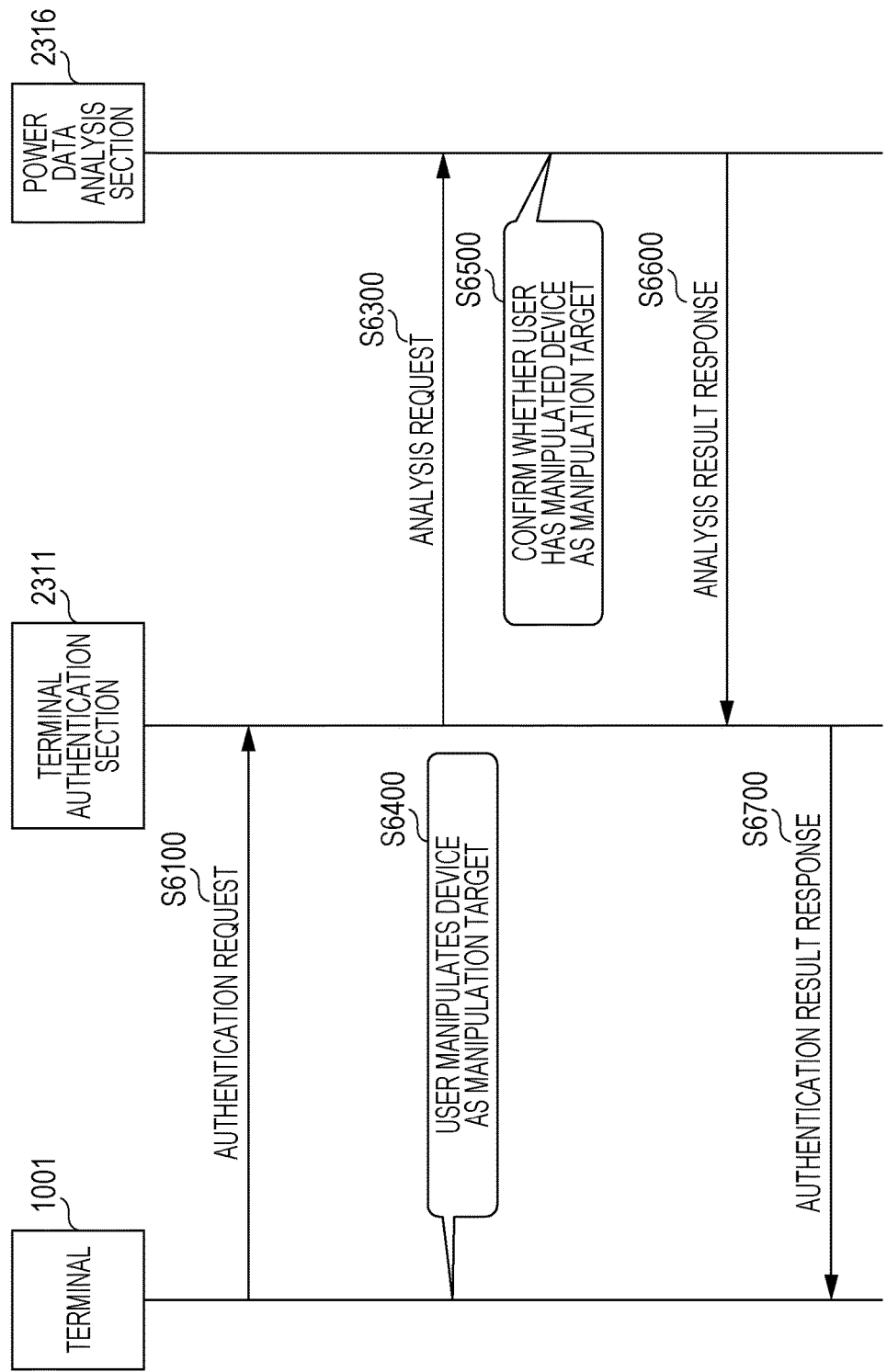
FIG. 11 is a sequence diagram showing an example of a process to be performed between a group and a service provider in authentication operation of an authentication system according to a second embodiment.

FIG. 11 is a sequence diagram showing an example of a process to be performed between a group 1200 and a service provider 1300 in authentication operation of an authentication system according to the second embodiment.

In the second embodiment, the user 1000 determines the device 1201 as a manipulation target and manipulation details. An authentication request to be transmitted in S6100 includes a "device ID" of the device 1201 as a manipulation target and "manipulation details", in addition to a "terminal ID" and a "group ID".

Figure 12:
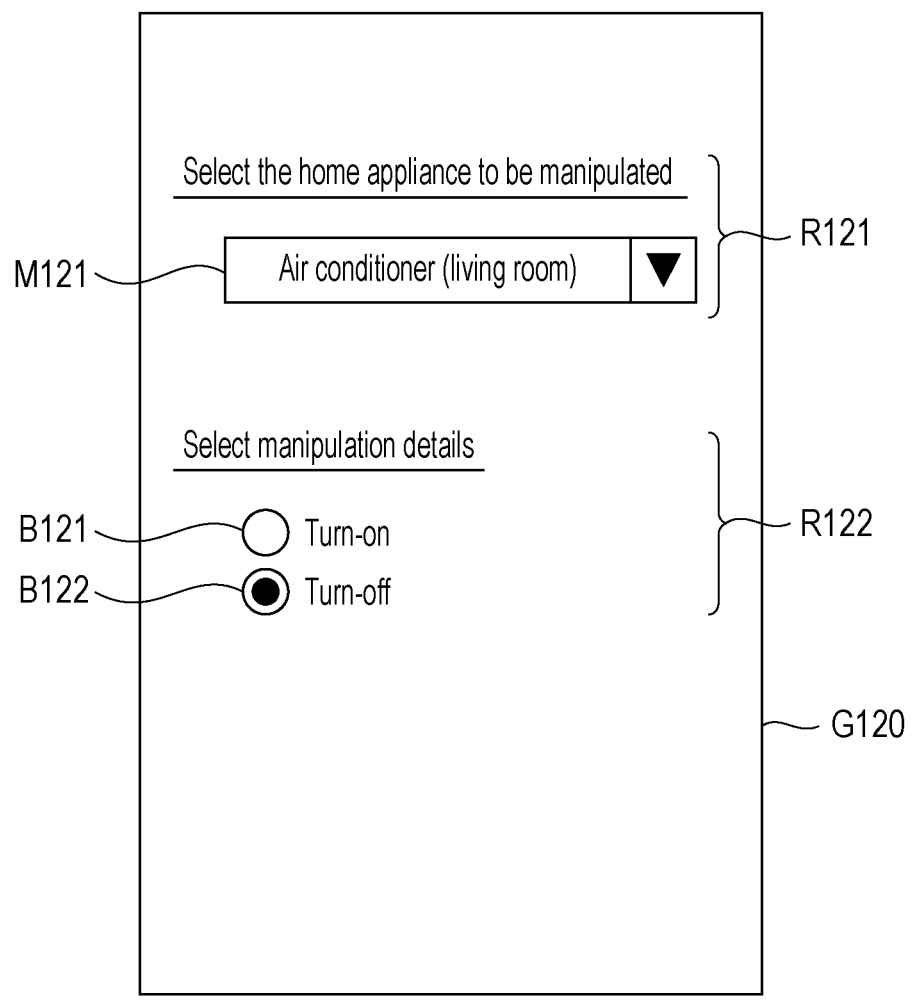
FIG. 12 is a view showing an example of a manipulation screen for a user to determine a device as a manipulation target and manipulation details in the authentication system according to the second embodiment.

FIG. 12 is a view showing an example of a manipulation screen G120 for the user 1000 to determine the device 1201 as a manipulation target and manipulation details in the authentication system according to the second embodiment.

The manipulation screen G120 includes a device selection field R121 for selecting the device 1201 as a manipulation target and a manipulation details selection field R122 for selecting manipulation details.

The device selection field R121 is for a user to designate the device 1201 to be manipulated. In the example in FIG. 12, the device selection field R121 has the message "Select the home appliance to be manipulated". The device selection field R121 includes a device display field M121. When a manipulation of selecting a menu button at the right end is input in the device display field M121, the terminal 1001 displays a display menu with a list of selectable devices. When the user 1000 inputs a manipulation of selecting one or more of the devices 1201, the terminal 1001 determines the one or more of the devices 1201 selected by the user 1000 as the device(s) 1201 as a manipulation target (manipulation targets). The air conditioner in the living room is selected here. Note that the terminal 1001 may recognize the selectable devices 1201 by the user 1000 inquiring the selectable devices 1201 of the server 1310. The selectable device 1201 is, for example, the device 1201 that is registered in a device management table T400 and belongs to the same group 1200 as the user 1000.

The manipulation details selection field R122 is for a user to designate details of a manipulation on the device 1201 selected in the device selection field R121. The example in FIG. 12 has the message "Select manipulation details". The manipulation details selection field R122 includes two radio buttons B121 and B122. The radio button B121 is associated with turn-on while the radio button B122 is associated with turn-off.

The terminal 1001 determines turn-on as manipulation details if the user 1000 selects the radio button B121 and determines turn-off as manipulation details if the user selects the radio button B122.

The terminal 1001 includes the device 1201 as a manipulation target and manipulation details selected through the manipulation screen G120 in an authentication request and transmits the authentication request to the service provider 1300.

Note that a number-of-times designation field may be provided on the manipulation screen G120 such that a manipulation of repeating a manipulation of turning on the device 1201 and then turning off the device 1201 n times can be selected. Additionally, a wash program selection field or a dimming level selection field may be provided on the manipulation screen G120 such that a wash program in a washing machine or a dimming level of a lighting fixture as described above can be selected. Note that a manipulation to be displayed in the manipulation details selection field R122 is a manipulation, waveform information corresponding to which is registered in a power feature quantity information management section 2315.

A plurality of device selection fields R121 may be provided on the manipulation screen G120 to permit selection of a plurality of devices 1201 as manipulation targets.

Referring back to FIG. 11, not the server 1310 but the user 1000 determines the device 1201 as a manipulation target and manipulation details in the second embodiment. The process in S6200 in FIG. 6 is omitted in FIG. 11. S6300, S6500, S6600, and S6700 are the same as those in FIG. 6.

In S6400 subsequent to S6300, the user 1000 manipulates the device 1201 as the manipulation target. For example, assume that the user 1000 determines the air conditioner in the living room as the device 1201 as the manipulation target and turn-on as the manipulation details. In this case, the user 1000 performs a manipulation of turning on the air conditioner in the living room within an analysis period after the transmission of the authentication request. In S6500, a power data analysis section 2316 generates an analysis result response including an analysis result to the effect that confirmation is obtained if the manipulation of turning on the air conditioner in the living room is confirmed within the analysis period and generates an analysis result response including an analysis result to the effect that confirmation is not obtained if the manipulation of turning on the air conditioner in the living room is not confirmed within the analysis period. Note that S6300 is before S6400 in FIG. 11. However, S6300 may be after S6400 as long as S6300 is after S6100.

In the authentication system according to the second embodiment, the user 1000 determines the device 1201 as a manipulation target and manipulation details. The user 1000 can prevent erroneous manipulation of the device 1201 by, for example, determining the ordinarily familiar device 1201 as the device 1201 as a manipulation target. In the second embodiment, the user 1000 can also determine one or more devices 1201 which are always manipulated when the user 1000 is out as the devices 1201 as manipulation targets and determine, as manipulation details, a manipulation to be always performed on the devices 1201 when the user 1000 is out. This allows smooth authentication work.

Since the terminal 1001 is authenticated through manipulation of the device 1201 belonging to the group 1200, the same effects as those of the first embodiment can be obtained.

Third Embodiment

In the second embodiment, the user 1000 performs a manipulation on the device 1201 after transmission of an authentication request. A third embodiment is characterized in that a user 1000 transmits an authentication request after performing a manipulation on a device 1201. Note that the same components in the present embodiment as those in the first embodiment are denoted by the same reference characters and a description of the components will be omitted.

Figure 13:
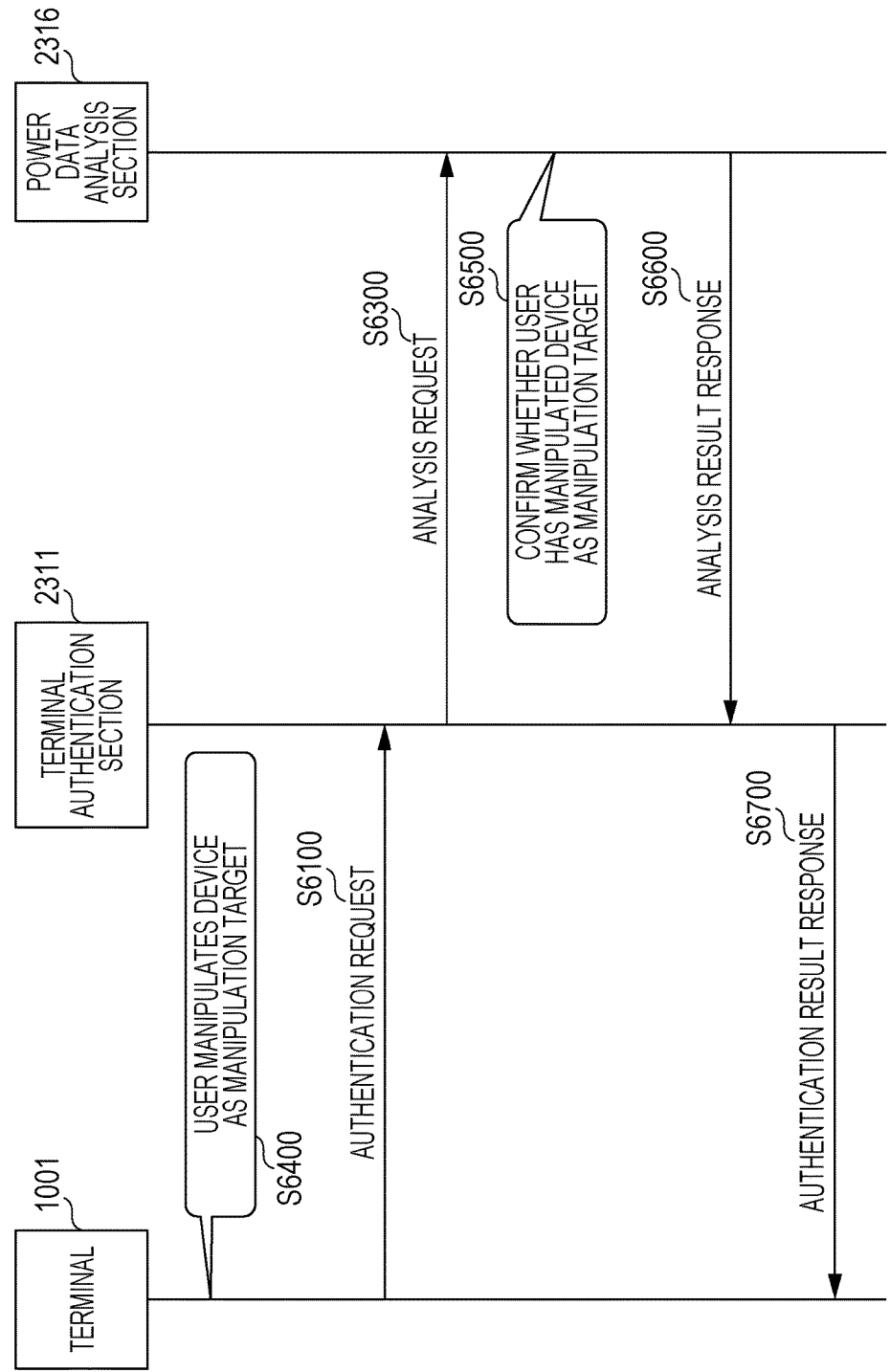
FIG. 13 is a sequence diagram showing an example of a process to be performed between a group and a service provider in authentication operation of an authentication system according to a third embodiment.

FIG. 13 is a sequence diagram showing an example of a process to be performed between a group 1200 and a service provider 1300 in authentication operation of an authentication system according to the third embodiment.

In S6400, the user 1000 performs a manipulation on the device 1201 as a manipulation target. At this time, the user 1000 performs a manipulation on one or a plurality of devices 1201 among the devices 1201 registered in advance in the service provider 1300. The manipulation to be performed by the user 1000 is a manipulation, waveform information corresponding to which is registered in a power feature quantity information management section 2315, and is, for example, a manipulation of turning on the device 1201 and then turning off the device 1201 illustrated as an example in the first embodiment.

In S6100 subsequent to S6400, a terminal 1001 transmits an authentication request. At this time, not only a "group ID" and a "terminal ID" but also a "device ID" of the device 1201 already manipulated and details of the manipulation performed on the device 1201 are included in the authentication request. S6300, S6500, S6600, and S6700 are the same as those in FIG. 6. Note that the terminal 1001 may display a manipulation screen G120 shown in FIG. 12, accept input of the manipulation already performed by the user 1000 and the device 1201, on which the manipulation is performed, and include the manipulation and the device 1201 in an authentication request at the time of the transmission of the authentication request.

A power data analysis section 2316 may acquire power usage information for a fixed period before a time of acquisition of the authentication request by a terminal authentication section 2311 from a power usage table T300 and judge, using the acquired power usage information, whether the device 1201 is manipulated in accordance with the manipulation declared in the authentication request by the user 1000. For the judgment, the analysis processing described in the first embodiment may be adopted.

As the fixed period, for example, a predetermined time which is conceivable as a time from when the user 1000 starts manipulating the device 1201 to the transmission of the authentication request can be adopted.

As described above, in the authentication system according to the third embodiment, the user 1000 determines the device 1201 as a manipulation target and manipulation details, the same effects as those of the second embodiment can be obtained. Since the terminal 1001 is authenticated through manipulation of the device 1201 belonging to the group 1200, the same effects as those of the first embodiment can also be obtained.

(Modifications)

The present disclosure can be modified in the manners below.

(1) Specifically, each of the above-described apparatuses (the server 1310, the terminal 1001, the device 1201, the GW apparatus 1203, and the like) can be implemented by a computer system which is composed of a microprocessor, a ROM, a RAM, a hard disk unit, a display unit, a keyboard, a mouse, and the like. A computer program is stored in the RAM or the hard disk unit. The microprocessor operates in accordance with the computer program, which causes the apparatus to achieve its functions. The computer program here is composed of a plurality of instruction codes, each of which indicates a command to a computer, combined to achieve a prescribed function.

(2) Some or all of constituent elements constituting each of the above-described apparatuses (the server 1310, the terminal 1001, the device 1201, the GW apparatus 1203, and the like) may be composed of one system large scale integration (LSI). The system LSI is a super-multifunctional LSI which is manufactured by packaging a plurality of constituent portions on one chip and is, specifically, a computer system which is composed of a microprocessor, a ROM, a RAM, and the like. A computer program is stored in the ROM. The microprocessor loads the computer program from the ROM onto the RAM and performs operation, such as computation, in accordance with the loaded computer program. In this manner, the system LSI achieves its functions.

(3) Some or all of constituent elements constituting each of the above-described apparatuses (the server 1310, the terminal 1001, the device 1201, the GW apparatus 1203, and the like) may be composed of an IC card or a single module detachable from the apparatus. The IC card or the module is a computer system which is composed of a microprocessor, a ROM, a RAM, and the like. The IC card or the module may include a super-multifunctional LSI as described above. The microprocessor operates in accordance with the computer program, which causes the IC card or the module to achieve its functions. The IC card or the module may have tamper resistance.

(4) The present disclosure may be implemented by the above-described methods. Alternatively, the present disclosure may be implemented by a computer program which implements these methods with a computer or by digital signals composed of a computer program.

The present disclosure may be implemented by a computer-readable recording medium, such as a flexible disk, a hard disk, a CD-ROM, an MO, a DVD, a DVD-ROM, a DVD-RAM, a Blu-ray Disc® (BD), or a semiconductor memory, having recorded thereon a computer program or digital signals. Alternatively, the present disclosure may be implemented by digital signals recorded on these recording media.

The present disclosure may transmit a computer program or digital signals via a telecommunication line, a radio communication channel or a wired communication line, a network typified by the Internet, data broadcasting, or the like.

The present disclosure may be a computer system including a microprocessor and a memory. The memory may store a computer program, and the microprocessor may operate in accordance with the computer program.

The present disclosure may be implemented by a different independent computer system through recording a program or digital signals on a recording medium and transferring the recording medium or transferring a program or digital signals via a network or the like.

In each of the above-described embodiments, each constituent element may be composed of dedicated hardware or may be implemented through executing a software program suitable for the constituent element. Each constituent element may be implemented by a program execution section, such as a CPU or a processor, through reading out and executing a software program recorded on a recording medium, such as a hard disk or a semiconductor memory.

For example, in FIG. 2, the terminal authentication section 2311 and the service provision section 2312 are each composed of a CPU or a processor and a communication apparatus. As the communication apparatus, for example, a communication apparatus for connecting the server 1310 to a communication network, such as the Internet, is adopted. The power data analysis section 2316 is composed of, for example, a CPU or a processor, and the power feature quantity information management section 2315 is composed of a memory. The power data management section 2313 and the group information management section 2314 are each composed of a CPU or a processor, a communication apparatus, and a memory.

The present disclosure may be one of the above-described programs or a non-transitory computer-readable recording medium having the program recorded thereon. The program can, of course, be circulated via a transmission medium, such as the Internet.

(5) The above-described embodiments and the above-described modifications may be combined.

The numerals used above are all illustrated as examples to concretely describe the present disclosure, and the present disclosure is not limited to the illustrated numerals.

Division into functional blocks in each block diagram is merely illustrative. A plurality of functional blocks may be implemented as one functional block, one functional block may be divided into a plurality of functional blocks, or some functions of a functional block may be transplanted to another functional block. Functions of a plurality of functional blocks having similar functions may be handled in parallel or in a time-division manner by a single piece of hardware or software.

The order in which steps in each of the above-described processes are executed is illustrated as an example to concretely describe the present disclosure. An order other than the above-described order may be adopted as long as the same result is obtained. Some of the steps may be executed simultaneously (in parallel) with other steps.

(Effects)

An authentication system according to one aspect of the present disclosure has been described above on the basis of the embodiments.

According to the present disclosure, a user can receive a service at a terminal without registering information associated with an individual (for example, biological information) or information associated with the terminal, registration of which causes a feeling of resistance.

A service provider need not perform management, such as ensuring the security of information provided from a user or information used for authentication or taking steps to leakage and personation, and management costs involved therein can be reduced.

An authentication system according to one or a plurality of aspects has been described on the basis of the embodiments. The present disclosure, however, is not limited to the embodiments. A form in which various modifications apparent to those skilled in the art are made to the embodiments or a form in which constituent elements according to different embodiments are combined may be included in the scope of the one or plurality of aspects without departing from the spirit of the present disclosure.

The present disclosure can be applied to a terminal authentication system. The present disclosure is useful as an information system which provides information to a terminal or remotely manipulates a device from a terminal.

What is claimed is:

1. An authentication method for authenticating a terminal in an authentication system which includes a server and which authenticates the terminal, the authentication method comprising:
    collecting power usage information of each of one or more devices belonging to a group of the devices to be authenticated at prescribed intervals;
    receiving, from the terminal, an authentication request including group identification information for identifying the group to be authenticated;
    upon receipt of the authentication request
        designating one of the devices as a manipulation target in the group of the devices to be authenticated, and providing to the terminal a notification
        identifying the designated device that is designated as the manipulation target,
        and including details of instructions for manipulating the designated device;
    determining, on a basis of a change in the power usage of at least one of the devices belonging to the group, whether the designated device designated as the manipulation target and identified in the notification is manipulated; and
    authenticating the terminal and transmitting authentication information to the terminal when the designated device designated as the manipulation target and identified in the notification is determined to be manipulated in accordance with the instructions for manipulating the designated device,
    wherein the server designates the manipulation target.

2. The authentication method according to claim 1, wherein the notification includes first and second parts, wherein the first part is transmitted to the terminal and the second part is transmitted and displayed on a device that belongs to the group and includes a display apparatus.

3. The authentication method according to claim 1, further comprising
    increasing the number of manipulations included in the instructions in the notification or increasing the number of designated devices designated as manipulation targets when the number of authentication requests received from the terminal decreases over time.

4. The authentication method according to claim 1, wherein
    the designated device is incapable of being remotely manipulated.

5. The authentication method according to claim 1, wherein
    the authentication request is transmitted from the terminal and includes an image of a space where a device belonging to the group is installed, wherein the authentication method further comprises
    identifying the designated device as the target of the manipulation using the image.

6. The authentication method according to claim 1, wherein the terminal belongs to the group, and wherein the authenticating further includes transmitting the authentication information to the terminal only when the terminal as a transmitter of the authentication request is connected to the group via a device belonging to the group.

7. The authentication method according to claim 1, wherein the terminal authenticated in the authenticating operation is denoted as an authenticated terminal, wherein the authentication method further comprises authenticating a plurality of additional terminals, which are denoted as authenticated additional terminals, wherein terminals that are currently authenticated are denoted as currently authenticated terminals and include the authenticated terminal and the authenticated additional terminals, wherein the authenticating further includes managing the number of currently authenticated terminals including the authenticated terminal and authenticated additional terminals, and, when the number of currently authenticated terminals reaches a prescribed number set in advance, the authentication information is not transmitted to the terminal that previously issued the authentication request after the prescribed number is reached.

8. The authentication method according to claim 1, wherein the transmitting operation further includes setting a time limit for the authentication information to be transmitted to the terminal.

9. The authentication method according to claim 1, wherein the group further includes the terminal and a different terminal different from the terminal, wherein the authentication method further comprises authenticating the different terminal and transmitting the authentication information to the different terminal before the terminal is authenticated, and notifying the different terminal, to which the authentication information is already transmitted, of the transmission of the authentication information to the terminal after the transmission of the authentication information to the terminal.

10. The authentication method according to claim 1, wherein the authentication method further comprises storing attribute information for identification of the one or more devices belonging to the group, and the storing includes receiving, from the terminal, an image of a space where a device belonging to the group is installed and storing information for identifying the device identified in the image by the attribute information.

11. The authentication method according to claim 1, wherein the determining is performed by comparing a change in the power usage of each of the devices belonging to the group with information accumulated in advance representing a change in power usage caused by manipulation of the designated device designated as the manipulation target.

* * * * *